US009329311B2

(12) United States Patent
Halverson et al.

(10) Patent No.: US 9,329,311 B2
(45) Date of Patent: May 3, 2016

(54) LIGHT CONTROL FILM

(75) Inventors: Kurt J. Halverson, Lake Elmo, MN (US); Raymond J. Kenney, Woodbury, MN (US); Brian W. Lueck, Houlton, WI (US); Kenneth A.P. Meyer, White Bear Lake Township, MN (US); Scott M. Tapio, Falcon Heights, MN (US); Michael E. Lauters, Hudson, WI (US); Olester Benson, Jr., Woodbury, MN (US); Gary E. Gaides, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 156 days.

(21) Appl. No.: 14/119,725

(22) PCT Filed: May 24, 2012

(86) PCT No.: PCT/US2012/039266

§ 371 (c)(1),
(2), (4) Date: Feb. 4, 2014

(87) PCT Pub. No.: WO2012/162458

PCT Pub. Date: Nov. 29, 2012

(65) Prior Publication Data

US 2014/0204464 A1 Jul. 24, 2014

Related U.S. Application Data

(60) Provisional application No. 61/489,901, filed on May 25, 2011.

(51) Int. Cl.
*G02B 5/02* (2006.01)
*G02F 1/1335* (2006.01)

(52) U.S. Cl.
CPC ............ *G02B 5/02* (2013.01); *G02F 1/133524* (2013.01); *G02B 2207/123* (2013.01)

(58) Field of Classification Search
CPC ...... G02B 5/02; G02B 5/0278; G02B 5/0294; G02B 27/0179; G02B 6/0011; G02F 1/133524; G02F 2001/133562; G02F 1/133606; G02F 1/133607; F21V 11/02; F21V 11/06
USPC ......................... 359/599, 601–614, 885–892; 362/606–607, 617, 217.02–217.03, 362/235–248, 390, 317, 342, 351, 354–355
See application file for complete search history.

(56) References Cited

U.S. PATENT DOCUMENTS

| | | | |
|---|---|---|---|
| 3,718,712 | A | 2/1973 | Tushaus |
| 4,553,818 | A | 11/1985 | Cohen |

(Continued)

FOREIGN PATENT DOCUMENTS

| | | | |
|---|---|---|---|
| JP | 57-165802 | A | 10/1982 |
| JP | 60-083901 | A | 5/1985 |

(Continued)

OTHER PUBLICATIONS

Extended European Search Report for EP 12789453.3, mailed on Oct. 14, 2014, 2 pages.

(Continued)

*Primary Examiner* — Scott J Sugarman
*Assistant Examiner* — Kristina Deherrera
(74) *Attorney, Agent, or Firm* — Yen Tong Florczak

(57) ABSTRACT

The present disclosure provides a light control film that is capable of transmitting light, or allowing a viewer to observe information, only within a viewing region centered around the normal (perpendicular line) to a surface. The light control film generally blocks information or light outside of this viewing region, and provides security in all directions including right-and-left and up-and-down of the film. The light control film includes a plurality of light-transmissive cavities that are surrounded by a light absorbing material, such that each of the plurality of cavities is optically isolated from adjacent cavities. Each of the light-transmissive cavities effectively block light which enters the cavity outside of a viewing (that is, cutoff) angle.

20 Claims, 5 Drawing Sheets

(56) References Cited

U.S. PATENT DOCUMENTS

| | | | |
|---|---|---|---|
| 4,576,850 | A | 3/1986 | Martens |
| 4,621,898 | A | 11/1986 | Cohen |
| 5,175,030 | A | 12/1992 | Lu |
| 5,183,597 | A | 2/1993 | Lu |
| 5,214,119 | A | 5/1993 | Leir |
| 5,384,571 | A | 1/1995 | Myers |
| 5,691,846 | A | 11/1997 | Benson |
| 5,888,594 | A | 3/1999 | David |
| 6,285,001 | B1 | 9/2001 | Fleming |
| 6,395,124 | B1 | 5/2002 | Oxman |
| 6,398,370 | B1 | 6/2002 | Chiu |
| 6,569,521 | B1 | 5/2003 | Sheridan |
| 6,663,978 | B1 | 12/2003 | Olson |
| 6,692,611 | B2 | 2/2004 | Oxman |
| 6,767,609 | B2 | 7/2004 | Aeling et al. |
| 6,778,336 | B2 | 8/2004 | Tracy |
| 6,822,792 | B2 | 11/2004 | Goto |
| 6,824,820 | B1 | 11/2004 | Kinning |
| 6,824,882 | B2 | 11/2004 | Boardman |
| 7,005,394 | B1 | 2/2006 | Ylitalo |
| 7,090,922 | B2 | 8/2006 | Zhou |
| 7,255,920 | B2 | 8/2007 | Everaerts |
| 7,361,474 | B2 | 4/2008 | Siegler |
| 7,686,463 | B2 | 3/2010 | Goto |
| 7,817,361 | B2 * | 10/2010 | Mimura et al. ............... 359/885 |
| 8,309,650 | B2 | 11/2012 | Determan |
| 8,378,046 | B2 | 2/2013 | Determan |
| 8,557,378 | B2 | 10/2013 | Yamanaka |
| 2001/0039099 | A1 | 11/2001 | Coronel |
| 2002/0155617 | A1 * | 10/2002 | Pham et al. ................... 436/165 |
| 2003/0027002 | A1 * | 2/2003 | Simpson et al. .............. 428/437 |
| 2004/0202879 | A1 | 10/2004 | Xia |
| 2006/0216523 | A1 | 9/2006 | Takaki |
| 2007/0054133 | A1 | 3/2007 | Sherman |
| 2007/0055019 | A1 | 3/2007 | Sherman |
| 2007/0082969 | A1 | 4/2007 | Malik |
| 2007/0212535 | A1 | 9/2007 | Sherman |
| 2007/0218261 | A1 | 9/2007 | Saitoh |
| 2007/0223867 | A1 | 9/2007 | Hwang |
| 2007/0231541 | A1 | 10/2007 | Humpal |
| 2008/0186558 | A1 | 8/2008 | Lee |
| 2008/0297908 | A1 | 12/2008 | Adachi |
| 2009/0105437 | A1 | 4/2009 | Determan |
| 2009/0115943 | A1 * | 5/2009 | Gaides ............................ 349/96 |
| 2010/0214506 | A1 | 8/2010 | Gaides |
| 2010/0271721 | A1 | 10/2010 | Gaides |

FOREIGN PATENT DOCUMENTS

| | | | |
|---|---|---|---|
| JP | 05-015836 | A | 1/1993 |
| JP | 08-220519 | A | 8/1996 |
| JP | 11-156869 | A | 6/1999 |
| JP | 2002-323428 | A | 11/2002 |
| JP | 2005-189303 | A | 7/2005 |
| JP | 2007-140543 | A | 6/2007 |
| WO | WO 95-11464 | | 4/1995 |
| WO | WO 2009-061673 | | 5/2009 |
| WO | WO 2009-085662 | | 7/2009 |
| WO | WO 2009-089137 | | 7/2009 |
| WO | WO 2009-114683 | | 9/2009 |
| WO | WO 2010-033571 | | 3/2010 |
| WO | WO 2010-077541 | | 7/2010 |
| WO | WO 2010-132176 | | 11/2010 |
| WO | WO 2011-053419 | | 5/2011 |
| WO | WO 2011-063332 | | 5/2011 |
| WO | WO 2012-061296 | | 5/2012 |

OTHER PUBLICATIONS

International Search Report for PCT International Application No. PCT/US2012/039266, mailed on Dec. 20, 2012, 3 pages.

* cited by examiner

LIGHT CONTROL FILM

BACKGROUND

Light control film (LCF), also known as light collimating film, is an optical film that is configured to regulate the transmission of light, often to obscure what is being viewed from others (for example, privacy film). Various LCFs are known, and typically include a light transmissive film having a plurality of parallel grooves wherein the grooves are formed of a light-absorbing material.

LCFs can be placed proximate a display surface, image surface, or other surface to be viewed. At normal incidence, (i.e. 0 degree viewing angle) where a viewer is looking at an image through the LCF in a direction that is perpendicular to the film surface, the image is viewable. As the viewing angle increases, the amount of light transmitted through the LCF decreases until a viewing cutoff angle is reached where substantially all the light is blocked by the light-absorbing material and the image is no longer viewable. This can provide privacy to a viewer by blocking observation by others that are outside a typical range of viewing angles.

LCFs can be prepared by molding and ultraviolet curing a polymerizable resin on a polycarbonate substrate. Such LCFs are commercially available from 3M Company, St. Paul, Minn., under the trade designation "3M™ Filters for Notebook Computers and LCD Monitors".

Conventional parallel grooved films are one-dimensional light control films, i.e. they have a light control effect only to the right and left (or up and down) of the film. A single sheet of conventional film thus cannot meet the user's need to ensure security in all directions including right-and-left and up-and-down of the film. In order to achieve a light control effect in various directions by a conventional light control film, two films could be overlapped with their louver directions crossing each other. However, this inevitably results in the problem of increasing the film thickness and decreasing the light transmittance.

SUMMARY

The present disclosure provides a light control film that is capable of transmitting light, or allowing a viewer to observe information, only within a viewing region centered around the normal (perpendicular line) to a surface. The light control film generally blocks information or light outside of this viewing region, and provides security in all directions including right-and-left and up-and-down of the film. The light control film generally includes a plurality of light-transmissive cavities that are surrounded by a light absorbing material, such that each of the plurality of cavities is optically isolated from adjacent cavities. Each of the light-transmissive cavities effectively block light which enters the cavity outside of a viewing (i.e., cutoff) angle.

In one aspect, the present disclosure provides a light control film that includes: a first major surface and an opposing second major surface; a light absorptive material extending between the first and second major surfaces; and a plurality of optically-isolated light transmissive cavities at least partially extending between the first and second major surfaces. Each of the plurality of cavities includes a first aperture coincident with the first major surface, a second aperture adjacent the second major surface, and at least one side wall extending between the first aperture and the second aperture. Further, the second aperture and the second major surface are separated by the light absorptive material having a land thickness greater than 0.1 microns.

In another aspect, the present disclosure provides a display device that includes a light control film. The light control film includes: a first major surface and an opposing second major surface; a light absorptive material extending between the first and second major surfaces; and a plurality of optically-isolated light transmissive cavities at least partially extending between the first and second major surfaces. Each of the plurality of cavities includes a first aperture coincident with the first major surface, a second aperture adjacent the second major surface, and at least one side wall extending between the first aperture and the second aperture. Further, the second aperture and the second major surface are separated by the light absorptive material having a land thickness greater than 0.1 microns.

In yet another aspect, the present disclosure provides a window film that includes a light control film. The light control film includes: a first major surface and an opposing second major surface; a light absorptive material extending between the first and second major surfaces; and a plurality of optically-isolated light transmissive cavities at least partially extending between the first and second major surfaces. Each of the plurality of cavities includes a first aperture coincident with the first major surface, a second aperture adjacent the second major surface, and at least one side wall extending between the first aperture and the second aperture. Further, the second aperture and the second major surface are separated by the light absorptive material having a land thickness greater than 0.1 microns.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used herein, "a," "an," "the," "at least one," and "one or more" are used interchangeably. Thus, for example, a substrate including "an" array can be interpreted to mean that the substrate can include "one or more" arrays.

The term "and/or" means one or all of the listed elements or a combination of any two or more of the listed elements.

Also herein, the recitations of numerical ranges by endpoints include all numbers subsumed within that range (for example, 1 to 5 includes 1, 1.5, 2, 2.75, 3, 3.80, 4, 5, etc.).

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
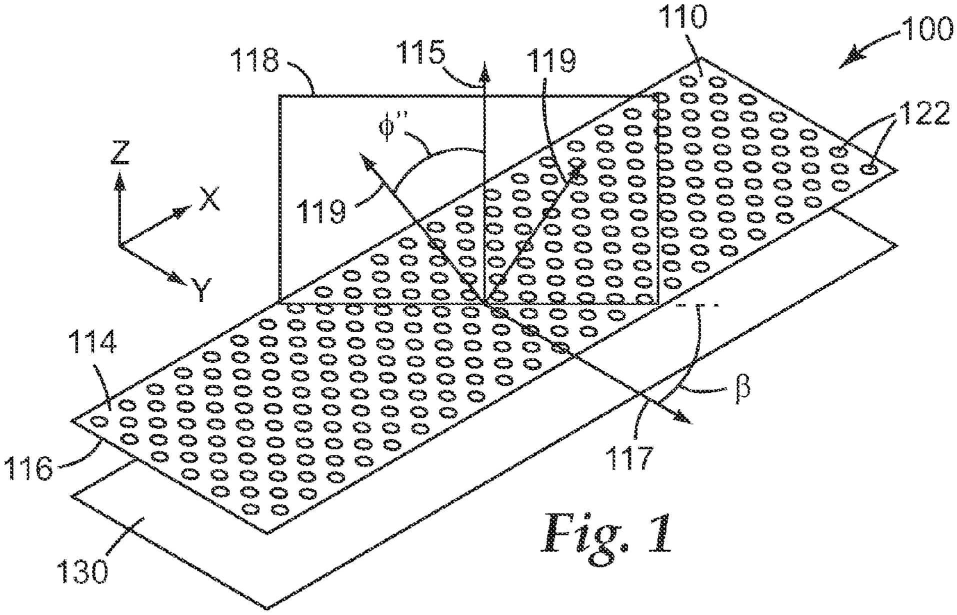
FIG. 1 shows a top perspective exploded view of a light control film.

The present disclosure provides a light control film that is capable of transmitting light, or allowing a viewer to observe information, only within a viewing region centered around the normal (perpendicular line) to a surface. The light control film generally blocks information or light outside of this viewing region and provides security in all directions including right-and-left and up-and-down of the film. The light control film includes a plurality of light-transmissive cavities that are surrounded by a light absorbing material, such that each of the plurality of cavities is optically isolated from adjacent cavities. The light absorbing material surrounding each of the light-transmissive cavities effectively block light which enters the cavity outside of a viewing (that is, cutoff) angle. In some cases, for example when each of the cavities has a circular cross-section, the region can be a circular region having a uniform cutoff angle measured from the surface normal. In some cases, for example when each of the cavities has an oval cross-section, the region can be an oval region where, for example, up-down viewing is determined by one cutoff angle, and side-to-side viewing is determined by another cutoff angle.

The present disclosure can effectively use articles that were described, for example, in co-pending U.S. Patent Application No. 61/263,640 entitled "Microwell Array Articles and Methods of Use" filed on Nov. 23, 2010, the entire disclosure of which is herein included. The inventors have discovered that the described Microwell Array Articles can be adapted to provide a light control film having "360 degree" viewing properties; that is, limiting the viewing of information from any orientation around the normal (that is, perpendicular line) to a surface.

The present disclosure provides array articles including a substrate containing individual cavities (that is, microwells). The disclosure includes the process of fabricating the array including methods of forming multilayered structures (for example, laminates) including the substrate on which the array is formed, a flexible, optically-transmissive layer coupled thereto and, optionally, one or more removable protective layers. The inventors have discovered that it is particularly difficult to make flexible substrates with high-density microfeatures (for example, cavities) that are optically isolated in both axes of an X-Y plane, but remain optically transmissive in the corresponding Z axis. The inventors further have discovered that it is difficult to fabricate an array of optically-isolated cavities with a thin, flexible, highly-transmissive base. The present disclosure provides cavity arrays, and a process for making the cavity arrays, that overcome these difficulties. The inventive processes result in significant optical isolation of the individual cavities.

The cavities in the microstructured layer each have at least one side wall, a bottom (that is, second aperture) and both width and depth. The cavity can be any shape. In one embodiment, the shape of the cavity is preferably frustoconical, but the cavity can be multi-sided (that is, polygon shaped) so as to approximate a cylindrical or frustoconical shape. The cavity can have a smooth wall surface. In some embodiments, the cavity can have at least one irregular wall surface. The bottom of the cavity can be either planar or concave or convex.

Before any embodiments of the disclosure are explained in detail, it is to be understood that the disclosure is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," "containing," or "having" and variations thereof herein is meant to encompass the items listed thereafter and equivalents thereof as well as additional items. Unless specified or limited otherwise, the terms "supported," and "coupled" and variations thereof are used broadly and encompass both direct and indirect supports and couplings. It is to be understood that other embodiments may be utilized and structural or logical changes may be made without departing from the scope of the present disclosure. Furthermore, terms such as "front," "rear," "top," "bottom," and the like are only used to describe elements as they relate to one another, but are in no way meant to recite specific orientations of the apparatus, to indicate or imply necessary or required orientations of the apparatus, or to specify how the articles described herein will be used, mounted, displayed, or positioned in use.

DEFINITIONS

Unless otherwise defined, all technical and scientific terms used herein have the same meaning as commonly understood by one of ordinary skill in the relevant art to. Methods and materials similar or equivalent to those described herein can be used in the practice of the present disclosure, and exemplified suitable methods and materials are described below. For example, methods may be described which include more than two steps. In such methods, not all steps may be required to achieve a defined goal and the invention envisions the use of isolated steps to achieve these discrete goals. The disclosures of all publications, patent applications, patents and other references are incorporated herein by reference in their entirety. In addition, the materials, methods, and examples are illustrative only and not intended to be limiting.

"Optically transparent" refers to the ability of light to transmit through a material. "Optically isolated", as used herein, refers to a condition whereby light that is directed into a cavity, is not substantially transmitted laterally through the article and detectably associated with a proximate cavity (that is, less than 20% of the light; preferably, less than 10% of the light; more preferably, less than 5% of the light; even more preferably, less than 1% of the light is transmitted and detectably associated with a proximate cavity).

An "array of regions on a solid support" is a linear or two-dimensional array of preferably discrete regions, each having a finite area, formed on the surface of a solid support.

A "cavity array" is an array of cavities having a density of discrete cavities of at least about $100/cm^2$, and preferably at least about $10/mm^2$. The cavities have a three-dimensional structure with dimensions, for example, openings with, for example, diameters in the range of between about 5-250 μm, depths in the range between about 2 to 250 microns. By "array" herein is meant a plurality of cavities, which are localized wells or chambers in an array format on the substrate material; the size of the array and its reaction chambers will depend on the composition and end use of the array. The array can be any regular array such as a close-packed array or a rectangular array, or the cavities can be randomly distributed.

FIG. 1 shows a top perspective exploded view of light control film (LCF) 100, according to one aspect of the present disclosure. The LCF 100 includes a microstructured layer 110 with a first major surface 114 and an opposing second major surface 116. The first major surface 114 includes an array of optically-isolated light transmissive cavities 122. In one particular embodiment, each of the optically-isolated light transmissive cavities 122 include a cross-section parallel to the first major surface 114 that can be circular shaped, oval shaped, or polygon shaped. In one particular embodiment, the cross-section can decrease in size in the direction from the first major surface 114 to the second major surface 116, as described elsewhere.

The LCF 100 further includes an optically-transmissive flexible layer 130 coupled to the second major surface 116 of the microstructured layer 110. FIG. 1 further shows a set of coordinate axes to illustrate that the cavities 122 are optically isolated such that light is not substantially transmitted within the plane formed by the X-Y axes. However, light can be substantially transmitted from the cavities 122 in a direction that is predominantly oriented toward the Z axis (that is, in the perpendicular direction from the LCF 100).

In one particular embodiment, a viewing plane 118 is shown to be positioned at an azimuthal angle β from the Y-Z plane (defined by a perpendicular line 115 parallel to the Z-axis and the line 117 parallel to the Y-axis). The viewing plane 118 includes the perpendicular line 115 parallel to the Z-axis, and extends perpendicular to the X-Y plane. The viewing plane 118 further includes viewing cutoff lines 119 located at a viewing cutoff angle ϕ" measured from the perpendicular line 115, such that for any angle greater than the viewing cutoff angle ϕ", light is not substantially transmitted through LCF 100. The magnitude of the viewing cutoff angle ϕ" can vary, depending on the azimuthal angle β and the geometry of the cavities 122, as described elsewhere. In some embodiments, the viewing cutoff angle ϕ" can vary from about 10 degrees to about 70 degrees. In some embodiments, the viewing cutoff angle ϕ" can remain constant as the azimuthal angle varies from 0 to 360 degrees (for example, when the cavities include a circular cross-section). In some embodiments, the viewing cutoff angle ϕ" can vary as the azimuthal angle varies from 0 to 360 degrees.

Figure 2A:
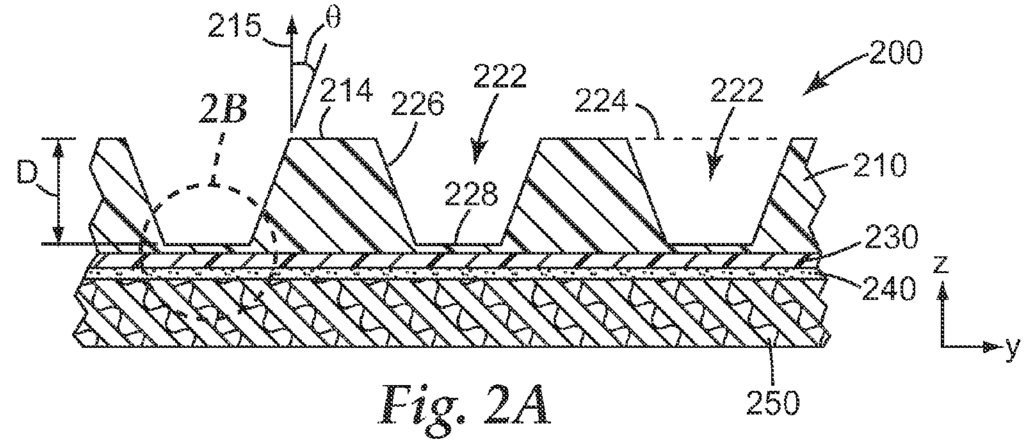
FIG. 2A shows a cross-sectional view of a light control film.

FIG. 2A shows a cross-sectional view of an LCF 200 according to one aspect of the disclosure. Each of the elements 210-230 shown in FIG. 2A corresponds to like-numbered elements 110-130 shown in FIG. 1, which have been described previously. For example, first major surface 114 described with reference to FIG. 1 corresponds to first major surface 214 shown in FIG. 2A, and so on. In FIG. 2A, a cross-sectional view of LCF 100 of FIG. 1 through a viewing plane 118 equivalent to the Y-Z plane is shown. LCF 200 includes a microstructured layer 210. The microstructured layer 210 includes an array of optically isolated light transmissive cavities 222. Each cavity 222 includes a first aperture 224, a second aperture 228, and at least one side wall 226 extending from the first aperture 224 to the second aperture 228. Each of the at least one side walls 226 forms a sidewall angle θ with a perpendicular 215 to the first major surface 214.

Each of the cavities 222 further includes a depth "D" which is the perpendicular distance between first aperture 224 and second aperture 228. First aperture 224 and second aperture 228 have a first aperture width "W1" and a second aperture width "W2" (not shown), respectively. Since each aperture may be either circular, oval, or polygonal, each width is determined based on the cross-section of the cavities 222 in the viewing plane 118, as described elsewhere.

The aspect ratio D/W generally determines the effective viewing angle in a direction governed by the aspect ratio. The light absorbing region of microstructured layer 210 are made of sufficient opacity and thickness that essentially any light that enters microstructured layer 210 through side wall 226 is absorbed by microstructured layer 210. The LCF 200 would have a viewing angle of 70 degrees in a direction governed by an aspect ratio (AR) of 1.25. The viewing angle is 10 degrees in a direction governed by an aspect ratio of 8.25. As such, an AR<1.25 corresponds to view angles greater than 70 degrees, and an AR>8.25 corresponds to view angles less than 10 degrees. In one particular embodiment, each of the plurality of optically-isolated light transmissive cavities 222 include an aspect ratio of D/((W1+W2)/2) equal to at least 1.25, and D/((W1+W2)/2) equal to not greater than 8.25. In one particular embodiment, W1=W2 and the ratios should be maximized for best cutoff angle, and the intercavity distance should be minimized for improved transmission.

The microstructured layer includes a colorant that is substantially nontransmissive to selected wavelengths of light, as described elsewhere. The disclosed articles of the present disclosure provide for a cavity array article wherein selected wavelengths of light are substantially transmitted through the bottom of each cavity while the selected wavelengths of light are substantially absorbed by the side walls of each cavity (or, in some cases, reflected by the side walls of each cavity). In one particular embodiment, optical cross-talk can be reduced or eliminated between adjacent cavities.

The cavities can be in a pattern, i.e. a regular design or configuration, or the cavities can be randomly distributed on the array surface. In one embodiment, there is a regular pattern of cavities having a separation or pitch that is compatible with the pitch of a liquid crystal display. "Pattern" in this sense includes a repeating unit, preferably one that allows a high density of cavities on the substrate.

The shape of the cavities in the microstructured layer can be square, round or polygonal (for example, pentagonal, hexagonal, octagonal) in shape. Preferably, the side walls of the cavities are substantially straight and form an angle (with the substantially planar surface of the microstructured layer) that is greater than 90 degrees. The angled side wall produces a frustoconical-shaped cavity in an embodiment wherein the first aperture and the second aperture of the cavity are circular in shape, for example.

The cavities are separated with spaces between each other. As is appreciated by those skilled in the relevant art, the spacing is determined by calculating the distance between centers, and consideration of the pixel size and spacing in a display. Varying the spacing between sites can result in the formation of arrays of high density, medium density or lower density. The cavities may be spaced any suitable distance apart. Spacing is determined by measuring the distance between the center points of two adjoining cavities. The cavities are generally spaced between 5 μm and 200 μm apart. In some embodiments, the cavities may be spaced about 10 μm to about 100 μm apart. In some embodiments, the cavities may be spaced about 12 μm to about 80 μm apart. In some embodiments, the cavities may be spaced about 15 to about 50 μm apart. In some embodiments, the cavities may be spaced about 0.5 to about 5.0 microns apart.

The cavities may have any suitable first aperture width W1. In one embodiment, the cavities have a first aperture width W1 of about 3 μm to about 100 μm. In one embodiment, the cavities have a first aperture width W1 of about 5 μm to about 70 μm. In some embodiments, the cavities have a first aperture width W1 of about 10 μm to about 50 μm.

The cavities may have any suitable depth D. The depth of substantially all of the cavities is generally about 5 μm to about 250 μm. In some embodiments, the depth of substantially all of the cavities is about 10 μm to about 100 μm. In some embodiments, the depth of substantially all of the cavities is about 30-60 μm. Substantially all of the cavities means at least 90% of the cavities. In some embodiments, substantially all of the cavities means at least 95% of the cavities. In some embodiments, substantially all of the cavities means at least 97% of the cavities. In a further embodiment, substantially all of the cavities means at least 99%, more preferably all, of the cavities. The depth of a cavity can be measured, for example using a Wyko NT9100 Optical Profiler (Veeco, Plainview, N.Y.). Routine cavity depth measurements can be made using the area difference plot feature of the instrument. The instrument can compare the depth of a plurality of cavities to a reference point on a flat surface of the substrate to provide an average cavity depth.

The microstructured layer 210 can be formed from a suitable material using a curing process described herein. Suitable materials include polymer materials (for example, acrylic-based resins derived from epoxies, polyesters, polyethers, and urethanes; ethylenically unsaturated compounds; aminoplast derivatives having at least one pendant acrylate group; polyurethanes (polyureas) derived from an isocyanate and a polyol (or polyamine); isocyanate derivatives having at least one pendant acrylate group; epoxy resins other than acrylated epoxies; and mixtures and combinations thereof) that can be processed to form the unitary, flexible microstructured layer 210 including a flexible layer 230 the plurality of cavities 222, each cavity 222 including the second aperture 228. In some embodiments, the polymer materials may be impermeable to water. In some embodiments, the flexible layer 230 can be coated with one or more materials, as described elsewhere.

The microstructured layer 210 is coupled to an optically-transmissive flexible layer 230. In some embodiments, the optically-transmissive flexible layer 230 substantially permits the transmission of visible wavelengths of light. In some embodiments, the optically-transmissive flexible layer 230 further permits the transmission of ultraviolet wavelengths of light. In some embodiments, the optically-transmissive flexible layer 230 includes a polymeric material. Nonlimiting examples of suitable polymeric materials include PC (polycarbonate), PET (polyethylene terephthalate, PEN (polyethylene naphthalate), HDPE (high density polyethylene, LDPE (low density polyethylene), LLDPE (linear low density polyethylene). PC, PET, and PEN are particularly preferred.

Optionally, the LCF 200 can include an adhesive layer 240; suitable adhesive materials of the adhesive layer 240 are described elsewhere. In some embodiments, the adhesive layer 240 can be incorporated into the LCF 200 by coating an adhesive onto the optically-transmissive flexible layer 230. In some embodiments, the adhesive layer 240 can be transferred to the LCF 200 by transferring the adhesive layer 240 from a carrier to the optically-transmissive flexible layer 230 via lamination processes that are known in the art, for example. Preferably, the adhesive layer 240 substantially permits the transmission of light (for example, ultraviolet and/or visible wavelengths of light).

The optional adhesive layer 240 can couple the LCF 200 to a variety of substrates 250 that can serve at least one of a variety of functions. In some embodiments, substrate 250 can be a flexible carrier (for example, paper, coated paper, polymeric film, metal film) that functions to carry the microstructured layer 210 or the materials that form the microstructured layer 210 during a processing step. In some embodiments, the substrate 250 can be a rigid or a flexible material (for example, architectural glazing, a glass slide, a plastic film, coated paper, and the like) and can function as a protective layer to retain functional properties (for example, structure, shape, size, chemical integrity, optical properties, and/or adhesion properties) associated with the article. In some embodiments, the substrate 250 may be a component of an imaging system (for example, a liquid crystal display, a camera, a lens, a fiber optic bundle) or other information-carrying device.

The substrate 250 can be a flexible component that can be used for a variety of purposes. Non-limiting examples of flexible substrates include polymer films, metal films, or paper. In some embodiments, the substrate 250 is a carrier (for example, a release liner) that is coated with adhesive layer 240 in order to transfer the adhesive layer 240 to the optically-transmissive flexible layer 230. Preferably, in these and other embodiments, the substrate 250 is coated with a release chemistry such as a silicone, fluorosilicone, wax, or other low surface energy material to facilitate release of the adhesive layer 240 from the substrate 250. Flexible substrates can be used for processing, carrying, and/or protecting the LCF 200 from damage or contamination.

The substrate 250 can be a rigid structural component (for example, a display surface, architectural glazing, a camera, a fiber optic faceplate, a microscope slide, a mirror) that causes an LCF to be inflexible or to retain structural memory. By coupling the LCF to a rigid substrate, the article can retain a shape that is optically interrogatable. The step of coupling the LCF to a rigid substrate is carried out by contacting the LCF directly to the substrate or by coating either the LCF and/or the rigid substrate with a bonding agent and then contacting the LCF/bonding agent to the substrate or substrate/bonding agent to the LCF. The result of the coupling step will be to cause the LCF to be attached to a rigid substrate.

A bonding agent useful in the adhering step of the method of the disclosure can be any substance that is capable of securing the attachment of the LCF to the substrate without adverse degradation of the substrate or the LCF. As will be appreciated by one skilled in the art, when the article is coated with the bonding agent, the back surface of the LCF will be coated; that is, the surface coated with the bonding agent is the surface of the LCF not containing the formed features such as cavities. Suitable bonding agents include, but are not limited to, liquid epoxies; glues or adhesives. Preferably, a pressure sensitive adhesive is used.

A rigid substrate can be formed from any of a variety of materials and will be selected according to the desired properties of the rigid substrate, including, but not limited to the above-discussed structural properties and other structural properties such as flatness, strength, stiffness, thickness, low thermal expansion coefficient, optical properties and chemical properties such as microstructured layer compatibility. For example, a rigid structure can be selected to have optical properties that include, but are not limited to being transparent, selectively transparent, having a selected refractive index, absorptive, selectively absorptive, opaque or reflective.

In addition, a metal or metal-coated rigid structure can be employed. Compositions for a rigid substrate include metals, such as aluminum, iron, steel, various alloys, and the like; ceramics; composites such as fiberglass; silicon or other semiconductor materials; glass; rigid plastics or polymers; and the like.

Figure 2B:
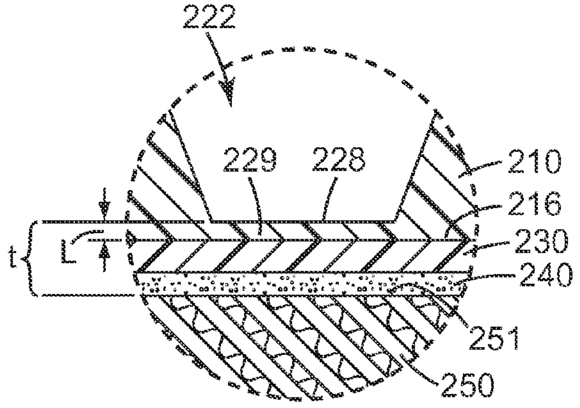
FIG. 2B shows a cross-sectional view of a portion of the light control film of FIG. 2A.

FIG. 2B shows a cross-sectional view of a portion of the LCF 200 of FIG. 2A, according to one aspect of the disclosure. Each of the elements 210-250 shown in FIG. 2B corresponds to like-numbered elements 210-250 shown in FIG. 2A, which have been described previously. For example, cavity 222 described with reference to FIG. 2A corresponds to cavity 222 shown in FIG. 2B, and so on.

FIG. 2B shows the microstructured layer 210 including cavity 222 with a second aperture 228. Also shown are the optically-transmissive flexible layer 230, optional adhesive layer 240 and optional substrate 250 having a substrate surface 251. Second major surface 216 of microstructured layer 210 is separated from second aperture 228 by a land region 229 that has a thickness "L". The land region 229 results from the preferred continuous process for preparation of the microstructured layer 210, as described elsewhere. Although it may be preferable to minimize the thickness "L" of this land region 229 (since it effectively reduces the light transmission through cavity 222), the preferred process does not completely eliminate the land region 229, as described elsewhere. In one particular embodiment, the land region 229 has a thickness L ranging from about 0.1 microns to about 10 microns, or about 0.1 microns to about 5 microns, or about 0.1 microns to about 1 micron or less.

The LCF 200 further includes a thickness "t" that indicates the minimum distance light must cross beyond cavity 222, in order to pass through LCF 200. In order for light to pass through LCF 200 and reach substrate 250, it must pass through the second aperture 228, the land region 229, the optically-transmissive flexible layer 230, and the adhesive layer 240, if present. Thus, each of the second aperture 228, the land region 229, the optically-transmissive flexible layer 230, and the adhesive layer 240, if present, must be transmissive to the wavelength or wavelengths of light to be detected.

Figure 2C:
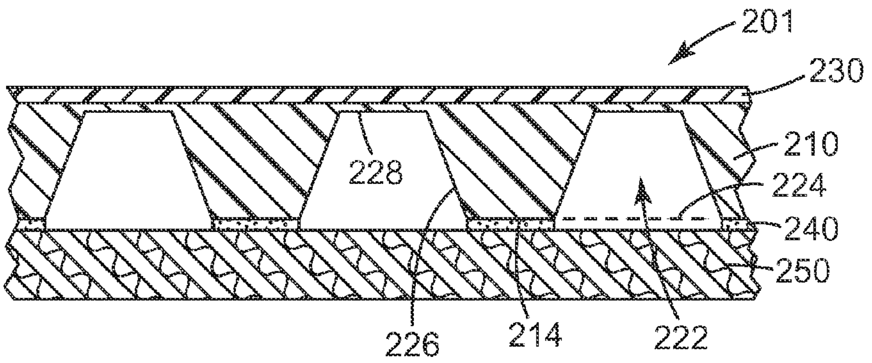
FIG. 2C shows a cross-sectional view of a light control film.

FIG. 2C shows a cross-sectional view of a light control film 201, according to one aspect of the disclosure. Each of the elements 210-250 shown in FIG. 2C corresponds to like-numbered elements 210-250 shown in FIG. 2A, which have been described previously. For example, cavity 222 described with reference to FIG. 2C corresponds to cavity 222 shown in FIG. 2A, and so on. Each of the cavities 222 includes first aperture 224, second aperture 228, and sidewall 226 between the first aperture 224 and the second aperture 228.

In FIG. 2C, a microstructured layer 210 is inverted such that a first major surface 214 and first aperture 224 are disposed adjacent a substrate 250, and optically-transmissive flexible layer 230 is disposed opposite substrate 250. In some embodiments, microstructured layer 210 can be attached to the substrate 250 at first major surface 214 using optional adhesive 240. In some embodiments (not shown), optical adhesive 240 can be disposed over the entirety of substrate 250. In some embodiments (also not shown), optional adhesive 240 can also be disposed within cavity 222 such that the entire region between sidewall 226, first aperture 224, and second aperture 228, and substrate surface 251 are filled with adhesive layer 240.

Figure 2D:
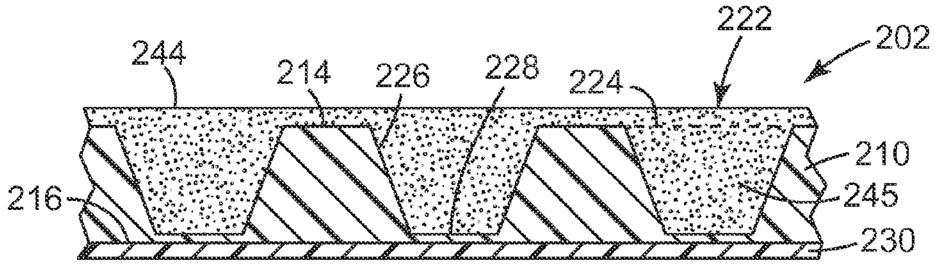
FIG. 2D shows a cross-sectional view of a light control film.

FIG. 2D shows a cross-sectional view of a light control film 202, according to one aspect of the disclosure. Each of the elements 210-230 shown in FIG. 2D corresponds to like-numbered elements 210-230 shown in FIG. 2A, which have been described previously. For example, cavity 222 described with reference to FIG. 2D corresponds to cavity 222 shown in FIG. 2A, and so on. In FIG. 2D, a microstructured layer 210 having a plurality of cavities 222, a first major surface 214, and a second major surface 216, is disposed on optically-transmissive flexible layer 230. Each of the cavities 222 includes first aperture 224, second aperture 228, and sidewall 226 between the first aperture 224 and the second aperture 228.

In FIG. 2D, a light transmissive material 245 completely fills cavities 222 and also optionally extends beyond the first major surface 214 and first apertures, forming a light transmissive surface 244 that is substantially parallel to optically-transmissive flexible layer 230. In one particular embodiment, the index of refraction of light transmissive material 245 can be lower, higher, or the same as the index of refraction of the material of the light absorptive material in microstructured layer 210 such that reflection via TIR from the sidewalls 236 can be either enhanced, or eliminated, as described for example, in U.S. Patent Application No. US2010/0214506 (Gaides et al.). In one particular embodiment, light transmissive material 245 is disposed as a 100% solids formulation (i.e., essentially solvent free), and can be the same material as adhesive layer 240 described in reference to FIGS. 2A-2C, such as a pressure sensitive adhesive (PSA) or a hot-melt adhesive.

The adhesive layer 240 (and an adhesive light transmissive material 245) can be formed using any suitable material or materials. In some embodiments, the adhesive layer 240 may include any suitable repositionable adhesive or pressure-sensitive adhesive (PSA).

In some embodiments, useful PSAs include those described in the Dalquist criterion line (as described in Handbook of Pressure Sensitive Adhesive Technology, Second Ed., D. Satas, ed., Van Nostrand Reinhold, New York, 1989.)

The PSA may have a particular peel force or at least exhibit a peel force within a particular range. For example, the PSA may have a 90° peel force of from about 10 to about 3000 g/in, from about 300 to about 3000 g/in, or from about 500 to about 3000 g/in. Peel force may be measured using a peel tester from IMASS.

In some embodiments, the PSA includes an optically clear PSA having high light transmittance of from about 80 to about 100%, from about 90 to about 100%, from about 95 to about 100%, or from about 98 to about 100% over at least a portion of the visible light spectrum (about 400 to about 700 nm). In some embodiments, the PSA has a haze value of less than about 5%, less than about 3%, or less than about 1%. In some embodiments, the PSA has a haze value of from about 0.01 to less than about 5%, from about 0.01 to less than about 3%, or from about 0.01 to less than about 1%. Haze values in transmission can be determined using a haze meter according to ASTM D1003.

In some embodiments, the PSA includes an optically clear adhesive having high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%, or from about 0.01 to less than about 1%.

In some embodiments, the PSA is hazy and diffuses light, particularly visible light. A hazy PSA may have a haze value of greater than about 5%, greater than about 20%, or greater than about 50%. A hazy PSA may have a haze value of from about 5 to about 90%, from about 5 to about 50%, or from about 20 to about 50%. The haze that diffuses the light should in some preferred embodiments be primarily forward scattering, meaning that little light is scattered back toward the originating light source.

The PSA may have a refractive index in the range of from about 1.3 to about 2.6, 1.4 to about 1.7, or from about 1.5 to about 1.7. The particular refractive index or range of refractive indices selected for the PSA may depend on the overall design of the LCF.

The PSA generally includes at least one polymer. PSAs are useful for adhering together adherends and exhibit properties such as: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. A quantitative description of PSAs can be found in the Dahlquist reference cited herein.

Exemplary poly(meth)acrylate PSAs are derived from: monomer A including at least one monoethylenically unsaturated alkyl (meth)acrylate monomer and which contributes to the flexibility and tack of the PSA; and monomer B including at least one monoethylenically unsaturated free-radically copolymerizable reinforcing monomer which raises the Tg of the PSA and contributes to the cohesive strength of the PSA. Monomer B has a homopolymer glass transition temperature (Tg) higher than that of monomer A. As used herein, (meth) acrylic refers to both acrylic and methacrylic species and likewise for (meth)acrylate.

Preferably, monomer A has a homopolymer Tg of no greater than about 0° C. Preferably, the alkyl group of the (meth)acrylate has an average of about 4 to about 20 carbon atoms. Examples of monomer A include 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. The alkyl group can include ethers, alkoxy ethers, ethoxylated or propoxylated methoxy (meth) acrylates. Monomer A may include benzyl acrylate.

Preferably, monomer B has a homopolymer Tg of at least about 10° C., for example, from about 10 to about 50° C. Monomer B may include (meth)acrylic acid, (meth)acrylamide and N-monoalkyl or N-dialkyl derivatives thereof, or a (meth)acrylate. Examples of monomer B include N-hydroxyethyl acrylamide, diacetone acrylamide, N,N-dimethyl acrylamide, N,N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of monomer B include itaconic acid, crotonic acid, maleic acid, fumaric acid, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam.

In some embodiments, the (meth)acrylate PSA is formulated to have a resultant Tg of less than about 0° C. and more preferably, less than about −10° C. Such (meth)acrylate PSAs include about 60 to about 98% by weight of at least one monomer A and about 2 to about 40% by weight of at least one monomer B, both relative to the total weight of the (meth) acrylate PSA copolymer.

Useful PSAs include natural rubber-based and synthetic rubber-based PSAs. Rubber-based PSAs include butyl rubber, copolymers of isobutylene and isoprene, polyisobutylene, homopolymers of isoprene, polybutadiene, and styrene/butadiene rubber. These PSAs may be inherently tacky or they may require tackifiers. Tackifiers include rosins and hydrocarbon resins.

Useful PSAs include thermoplastic elastomers. These PSAs include styrene block copolymers with rubbery blocks of polyisoprene, polybutadiene, poly(ethylene/butylene), poly(ethylene-propylene. Resins that associate with the rubber phase may be used with thermoplastic elastomer PSAs if the elastomer itself is not tacky enough. Examples of rubber phase associating resins include aliphatic olefin-derived resins, hydrogenated hydrocarbons, and terpene phenolic resins. Resins that associate with the thermoplastic phase may be used with thermoplastic elastomer PSAs if the elastomer is not stiff enough. Thermoplastic phase associating resins include polyaromatics, coumarone-indene resins, resins derived from coal tar or petroleum.

Useful PSAs include tackified thermoplastic-epoxy pressure sensitive adhesives as described in U.S. Pat. No. 7,005,394 (Ylitalo et al.). These PSAs include thermoplastic polymer, tackifier and an epoxy component.

Useful PSAs include polyurethane pressure sensitive adhesive as described in U.S. Pat. No. 3,718,712 (Tushaus). These PSAs include crosslinked polyurethane and a tackifier.

Useful PSAs include polyurethane acrylate as described in US 2006/0216523 (Shusuke). These PSAs include urethane acrylate oligomer, plasticizer and an initiator.

Useful PSAs include silicone PSAs such as polydiorganosiloxanes, polydiorganosiloxane polyoxamides and silicone urea block copolymers described in U.S. Pat. No. 5,214,119 (Leir, et al). The silicone PSAs may be formed from a hyrosilylation reaction between one or more components having silicon-bonded hydrogen and aliphatic unsaturation. The silicone PSAs may include a polymer or gum and an optional tackifying resin. The tackifying resin may include a three-dimensional silicate structure that is endcapped with trialkylsiloxy groups.

Useful silicone PSAs may also include a polydiorganosiloxane polyoxamide and an optional tackifier as described in U.S. Pat. No. 7,361,474 (Sherman et al.). Useful tackifiers include silicone tackifying resins as described in U.S. Pat. No. 7,090,922 B2 (Zhou et al.).

The PSA may be crosslinked to build molecular weight and strength of the PSA. Crosslinking agents may be used to form chemical crosslinks, physical crosslinks or a combination thereof, and they may be activated by heat, UV radiation and the like.

In some embodiments, the PSA is formed from a (meth) acrylate block copolymer as described in U.S. Pat. No. 7,255,920 B2 (Everaerts et al.). In general, these (meth)acrylate block copolymers include: at least two A block polymeric units that are the reaction product of a first monomer composition including an alkyl methacrylate, an aralkyl methacrylate, an aryl methacrylate, or a combination thereof, each A block having a Tg of at least 50° C., the methacrylate block copolymer including from 20 to 50 weight percent A block; and at least one B block polymeric unit that is the reaction product of a second monomer composition including an alkyl (meth)acrylate, a heteroalkyl (meth)acrylate, a vinyl ester, or a combination thereof, the B block having a Tg no greater than 20° C., the (meth)acrylate block copolymer including from 50 to 80 weight percent B block; wherein the A block polymeric units are present as nanodomains having an average size less than about 150 nm in a matrix of the B block polymeric units.

In some embodiments, the adhesive includes a clear acrylic PSA, for example, those available as transfer tapes such as VHB™ Acrylic Tape 4910F from 3M Company and 3M™ Optically Clear Laminating Adhesives (8140 and 8180 series), 3M™ Optically Clear laminating adhesives (8171 CL and 8172 CL) described in PCT patent publication 2004/0202879. Other exemplary adhesives are described in U.S. Patent Publication No. 2001/0039099 (Sherman et al.). In some embodiments, the adhesive includes a PSA formed from at least one monomer containing a substituted or an unsubstituted aromatic moiety as described in U.S. Pat. No. 6,663,978 B1 (Olson et al.).

In some embodiments, the PSA includes a copolymer as described in U.S. Ser. No. 11/875,194 (63656US002, Determan et al.), including (a) monomer units having pendant biphenyl groups and (b) alkyl (meth)acrylate monomer units.

In some embodiments, the PSA includes a copolymer as described in U.S. Provisional Application Ser. No. 60/983,735 (63760US002, Determan et al.), including (a) monomer units having pendant carbazole groups and (b) alkyl (meth) acrylate monomer units.

In some embodiments, the adhesive includes an adhesive as described in U.S. Provisional Application Ser. No. 60/986,298 (63108US002, Schaffer et al.), including a block copolymer dispersed in an adhesive matrix to form a Lewis acid-base pair. The block copolymer includes an AB block copolymer, and the A block phase separates to form microdomains within the B block/adhesive matrix. For example, the adhesive matrix may include a copolymer of an alkyl (meth)acrylate and a (meth)acrylate having pendant acid functionality, and the block copolymer may include a styrene-acrylate copolymer. The microdomains may be large enough to forward scatter incident light, but not so large that they backscatter incident light. Typically these microdomains are larger than the wavelength of visible light (about 400 to about 700 nm). In some embodiments the microdomain size is from about 1.0 to about 10 um.

The adhesive may include a stretch releasable PSA. Stretch releasable PSAs are PSAs that can be removed from a substrate if they are stretched at or nearly at a zero degree angle. In some embodiments, the adhesive or a stretch release PSA used as in the optical tape has a shear storage modulus of less than about 10 MPa when measured at 1 rad/sec and −17° C., or from about 0.03 to about 10 MPa when measured at 1 rad/sec and −17° C. Stretch releasable PSAs may be used if disassembling, reworking, or recycling is desired.

In some embodiments, the stretch releasable PSA may include a silicone-based PSA as described in U.S. Pat. No. 6,569,521 B1 (Sheridan et al.) or U.S. Provisional Application Nos. 61/020,423 (63934US002, Sherman et al.) and 61/036,501 (64151US002, Determan et al.). Such silicone-based PSAs include compositions of an MQ tackifying resin and a silicone polymer. For example, the stretch releasable PSA may include an MQ tackifying resin and an elastomeric silicone polymer selected from the group consisting of urea-based silicone copolymers, oxamide-based silicone copolymers, amide-based silicone copolymers, urethane-based silicone copolymers, and mixtures thereof.

In some embodiments, the stretch releasable PSA may include an acrylate-based PSA as described in U.S. Provisional Application Nos. 61/141,767 (64418US002, Yamanaka et al.) and 61/141,827 (64935US002, Tran et al.) Such acrylate-based PSAs include compositions of an acrylate, an inorganic particle and a crosslinker. These PSAs can be a single or multilayer.

The PSA and/or the structured surface layer can optionally include one or more additives such as filler, particles, plasticizers, chain transfer agents, initiators, antioxidants, stabilizers, viscosity modifying agents, antistats, fluorescent dyes and pigments, phosphorescent dyes and pigments, quantum dots, and fibrous reinforcing agents.

The adhesive may be made hazy and/or diffusive by including particles such as nanoparticles (diameter less than about 1 um), microspheres (diameter 1 um or greater), or fibers. Exemplary nanoparticles include $TiO_2$. In some embodiments, the viscoelastic lightguide may include a PSA matrix and particles as described in U.S. Provisional Application No. 61/097,685 (Sherman et al.;), including a optically clear PSA and silicone resin particles having a refractive index less than that of the PSA.

In some embodiments it may be desirable for the PSA to have a microstructured adhesive surface to allow for air bleed upon application. Methods for attachment of optical PSAs having air bleed are described in US publication number 2007/0212535.

The adhesive layer may include the cured reaction product of a multifunctional ethylenically unsaturated siloxane polymer and one or more vinyl monomers as described in US 2007/0055019 A1 (Sherman et al.;) and US 2007/0054133 A1 (Sherman et. al;).

The adhesive layer may include a PSA such that the layer exhibits aggressive tack when applied with little or no added pressure. PSAs are described in the Dalquist criterion line (as described in Handbook of Pressure Sensitive Adhesive Technology, Second Ed., D. Satas, ed., Van Nostrand Reinhold, New York, 1989). Useful PSAs include those based on natural rubbers, synthetic rubbers, styrene block copolymers, (meth) acrylic block copolymers, polyvinyl ethers, polyolefins, and poly(meth)acrylates. As used herein, (meth)acrylic refers to both acrylic and methacrylic species and likewise for (meth) acrylate.

An exemplary PSA includes a polymer derived from an oligomer and/or monomer including polyether segments, wherein from 35 to 85% by weight of the polymer includes the segments. These adhesives are described in US 2007/0082969 A1 (Malik et al.). Another exemplary PSA includes the reaction product of a free radically polymerizable urethane-based or urea-based oligomer and a free radically polymerizable segmented siloxane-based copolymer; these adhesives are described in U.S. Provisional Application 61/410,510 (Tapio et al.,).

In some cases, the adhesive layer includes an adhesive that does not contain silicone. Silicones include compounds having Si—O and/or Si—C bonds. An exemplary adhesive includes a non-silicone urea-based adhesive prepared from curable non-silicone urea-based oligomers as described in PCT Patent Publication No. WO 2009/085662. A suitable non-silicone urea-based adhesive may include an X-B-X reactive oligomer and ethylenically unsaturated monomers. The X-B-X reactive oligomer includes X as an ethylenically unsaturated group, and B as a non-silicone segmented urea-based unit having at least one urea group. In some embodiments, the adhesive layer is not microstructured.

Another exemplary adhesive includes a non-silicone urethane-based adhesive as described in International Application No. PCT/US2010/031689. A suitable urethane-based adhesive may include an X-A-B-A-X reactive oligomer and ethylenically unsaturated monomers. The X-A-B-A-X reactive oligomer includes X as an ethylenically unsaturated group, B as a non-silicone unit with a number average molecular weight of 5,000 grams/mole or greater, and A as a urethane linking group.

Figure 3A:
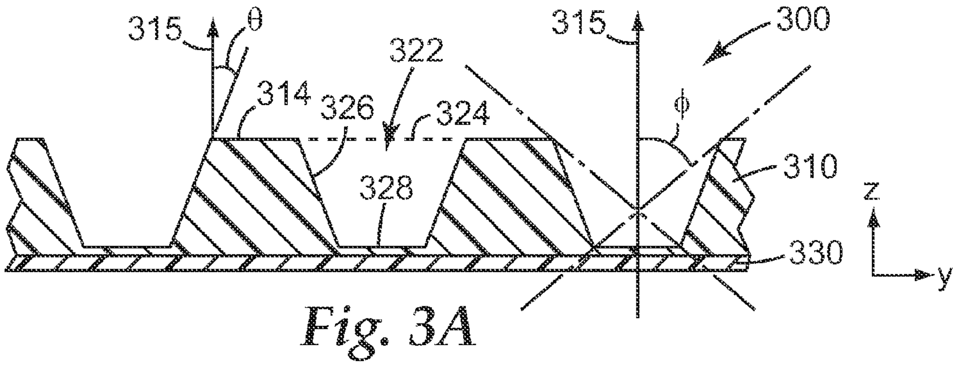
FIG. 3A shows a cross-sectional schematic of a light control film.

FIG. 3A shows a cross-sectional schematic of a light control film 300, according to one aspect of the disclosure. Each of the elements 310-330 shown in FIG. 3A corresponds to like-numbered elements 210-230 shown in FIG. 2A, which have been described previously. For example, first major surface 214 described with reference to FIG. 2A corresponds to first major surface 314 shown in FIG. 3A, and so on. In FIG. 3A, a cross-sectional view of LCF 100 of FIG. 1 through a viewing plane 118 equivalent to the Y-Z plane is shown, similar to that shown in FIG. 2A.

In FIG. 3A, LCF 300 includes a microstructured layer 310 that includes an array of optically isolated light transmissive cavities 322, and is disposed on an optically transparent film 330. Each cavity 322 includes a first aperture 324, a second aperture 328, and at least one side wall 326 extending from the first aperture 324 to the second aperture 328. Each of the at least one side walls 326 forms a sidewall angle θ with a perpendicular 315 to the first major surface 314. A first viewing cutoff angle ϕ measured from the perpendicular 315 can be geometrically defined from the cavities 322. Light rays intercepting LCF 300 outside of the first viewing cutoff angle ϕ can be intercepted by the sidewalls 326 in the microstructured layer 310, and either reflected or absorbed, as known to one of skill in the art. Further description of the path of light rays through LCFs including both reflection (such as through TIR) and absorption can be found, for example, in U.S. Patent Application No. US2010/0214506 (Gaides et al.).

Figure 3B:
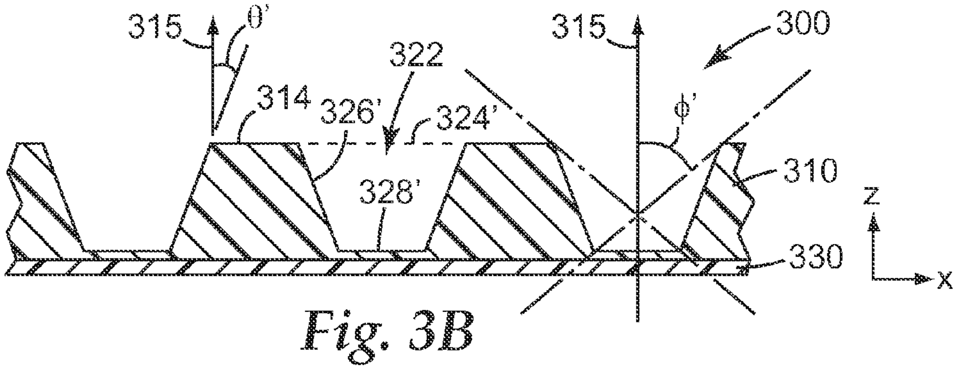
FIG. 3B shows a cross-sectional schematic of a light control film.

FIG. 3B shows a cross-sectional schematic of a LCF 300, according to one aspect of the disclosure. Each of the elements 310-330 shown in FIG. 3A corresponds to like-numbered elements 210-230 shown in FIG. 2A, which have been described previously. For example, first major surface 214 described with reference to FIG. 2A corresponds to first major surface 314 shown in FIG. 3A, and so on. In FIG. 3A, a cross-sectional view of LCF 100 of FIG. 1 through a viewing plane 118 equivalent to the X-Z plane is shown, perpendicular to the Y-Z plane view shown in either FIG. 2A or FIG. 3A.

In FIG. 3B, LCF 300 includes a microstructured layer 310 that includes an array of optically isolated light transmissive cavities 322, and is disposed on an optically transparent film 330. Since each of the cavities 322 can include cross-sections different from circular cross-sections, as described elsewhere, the geometry of each cavity 322 in the viewing plane 118 of FIG. 1, equivalent to the X-Z plane as shown if FIG. 3B can be different from the geometry of each cavity 222, 322 in the viewing plane 118 equivalent to the Y-Z plane as shown in FIGS. 2A and 3A. As such, the widths "W1" and "W2" associated with each cavity 322 can be different in either view and the geometry of each cavity 322 when viewed within either the X-Z or the Y-Z plane can be different, as known to one of skill in the art.

Each cavity 322 includes a first aperture 324', a second aperture 328', and at least one side wall 326' extending from the first aperture 324' to the second aperture 328'. Each of the at least one side walls 326' forms a second sidewall angle θ' with a perpendicular 315 to the first major surface 314. A second viewing cutoff angle ϕ' measured from the perpendicular 315 can be geometrically defined from the cavities 322. Light rays intercepting LCF 300 outside of the second viewing cutoff angle ϕ' can be intercepted by the sidewalls 326' in the microstructured layer 310, and either reflected or absorbed, as known to one of skill in the art. In some cases, for example when the cross-sectional area of cavity 322 corresponds to a circle, the first and second viewing cutoff angles ϕ, ϕ' can be the same.

Each planar viewing cut-off angle (for example ϕ and ϕ') is essentially determined from the aspect ratio given by D/((W1+W2)/2) where W1 and W2 are respective aperture widths in the particular viewing plane 118. In one particular embodiment, each of the plurality of optically-isolated light transmissive cavities 322 are such that the smallest aspect ratio is at least 1.25 and the largest aspect ratio is not greater than 8.25. The light control film 300 would have a viewing angle of not greater than 70 degrees in a direction governed by an aspect ratio of at least 1.25. The light control film 300 would have a viewing angle not less than 10 degrees in a direction governed by an aspect ratio not greater than 8.25.

Figure 4A:
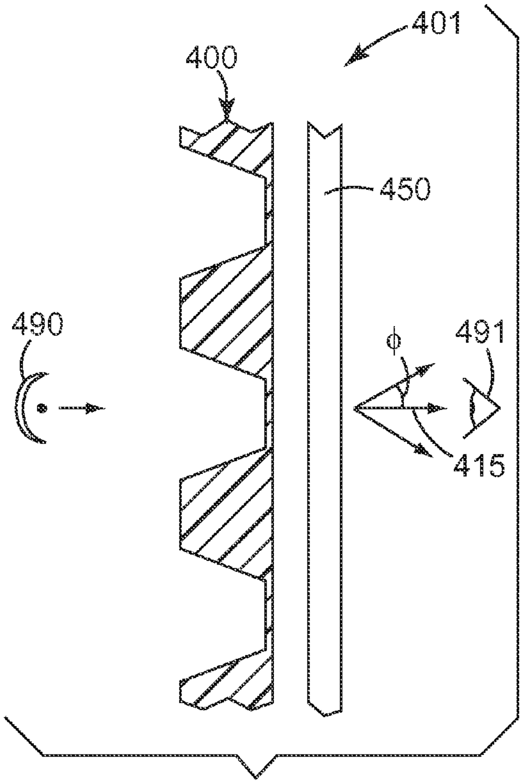
FIG. 4A shows a cross-sectional schematic of a light controlled article.

FIG. 4A shows a cross-sectional schematic of a light controlled article 401, according to one aspect of the disclosure. In FIG. 4A, an LCF 400 is disposed between a light source 490 and a substrate 450, and a viewer 491 is opposite the substrate 450 from light source 490. In some embodiments, substrate 450 can be a display such as a liquid crystal display, organic light emitting diode display, plasma display, electrophoretic display, printed image, and the like, or a window such as architectural glazing. In some embodiments, LCF 400 can include any of the modifications included herein, and can be oriented relative to substrate 450 as shown in either FIG. 2A or FIG. 2C. LCF 400 includes a viewing cutoff angle Φ as measured from perpendicular line 415. As such, LCF 400 prevents light rays from light source 490 that are outside viewing cutoff angle Φ from reaching viewer 491, as described elsewhere.

Figure 4B:
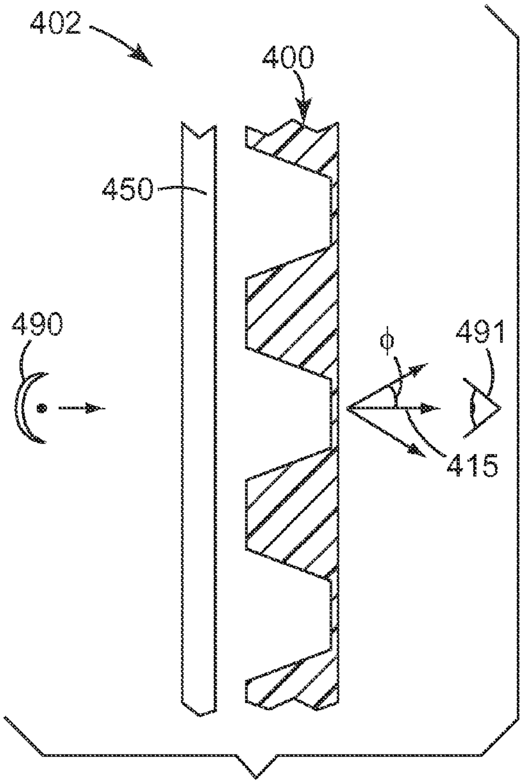
FIG. 4B shows a cross-sectional schematic of a light controlled article.

FIG. 4B shows a cross-sectional schematic of a light controlled article 402, according to one aspect of the disclosure. In FIG. 4B, substrate 450 is disposed between a light source 490 and an LCF 400, and a viewer 491 is opposite the LCF 400 from light source 490. In some embodiments, substrate 450 can be a display such as a liquid crystal display, organic light emitting diode display, plasma display, electrophoretic display, printed image, and the like, or a window such as architectural glazing. In some embodiments, LCF 400 can include any of the modifications included herein, and can be oriented relative to substrate 450 as shown in either FIG. 2A or FIG. 2C. LCF 400 includes a viewing cutoff angle Φ as measured from perpendicular line 415. As such, LCF 400 prevents light rays from light source 490 that are outside viewing cutoff angle Φ from reaching viewer 491, as described elsewhere.

Figure 4C:
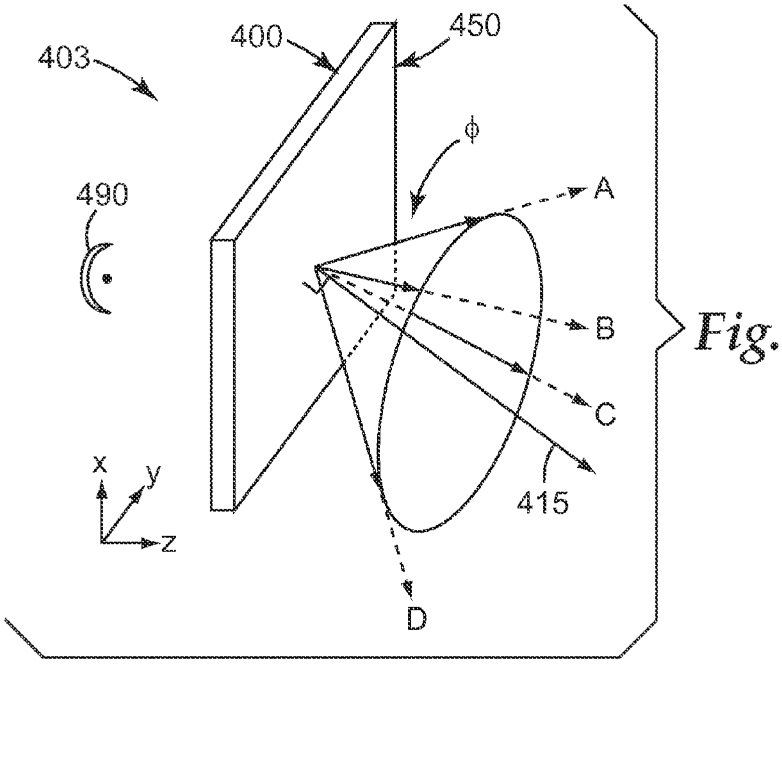
FIG. 4C shows a perspective schematic of a light controlled article.

FIG. 4C shows a perspective schematic of a light controlled article 403, according to one aspect of the disclosure. In FIG. 4C, substrate 450 and an LCF 400, are disposed between light source 490 and a viewer A, B, C, or D (similar to viewer 491 as described in either FIG. 4A or FIG. 4B). Viewers A, B, C, D are located at various positions around perpendicular 415 (such as left-right, up-down, and around a 360 degree circle surrounding perpendicular 415). As such, LCF 400 prevents light rays from light source 490 that are outside viewing cutoff angle Φ from reaching viewers A, B, C, D.

The present disclosure provides a process for making flexible cavity array articles. The process includes casting a curable resin composition onto a microstructured tool, curing the resin composition, and removing the resultant article from the tool. Similar processes are described in U.S. Pat. Nos. 5,175,030; 5,183,597; 5,384,571; 5,691,846; and 6,778,336; and in PCT Publication No. WO 9511464. Briefly summarizing, the process for making such cavity array articles includes the steps of:

a) providing
   a tool having a molding surface with a plurality of projections extending therefrom suitable for forming the microstructure elements (for example, cavities);
   a flowable, curable resin composition; and
   an optically-transmissive flexible layer having first and second major surfaces, wherein the first major surface of the optically-transmissive flexible layer can be surface-treated to promote adhesion to a cured resin composition, wherein the thickness of the optically-transmissive flexible layer is about 250 μm or less;
b) applying to the molding surface a volume of the resin composition suitable for forming the desired microstructure elements;
c) contacting the resin composition with the first major surface of the optically-transmissive flexible layer;
d) curing the resin composition while in contact with the flexible layer to form a cavity array article including a cured microstructured layer bonded to the flexible layer, and
e) removing the cavity array article from the tool.

The tool should be such that the projections will not deform undesirably during fabrication of the cavity array article, and such that the cavity array can be separated therefrom after curing.

Illustrative examples of substrates known to be useful for forming tools for replication of cavity array articles include materials that can be directly machined. Such materials preferably machine cleanly without burr formation, exhibit low ductility and low graininess, and maintain dimensional accuracy after formation of the projections. A variety of machinable plastics (including both thermoset and thermoplastic materials), for example, acrylics, and machinable metals, preferably nonferrous, for example, aluminum, brass, copper, and nickel are known. In many instances, it may be desired to use a first or later generation replicate of a machined or shaped surface as the tool (that is, the member on which the disclosed cavity arrays are formed). Depending upon the tool used and the nature of the resin composition, the cured cavity array may separate from the tool readily or a parting layer may be necessary to achieve desired separation characteristics. Illustrative examples of parting layer materials include an induced surface oxidation layer, an intermediate thin metallic coating, chemical silvering, and/or combinations of different materials or coatings that create a low energy surface, such as silicones or fluorinated materials, for example. If desired, suitable agents may be incorporated into the resin composition to achieve desired separation characteristics.

As discussed above, the tool can be made from polymeric, metallic, composite, or ceramic materials. In some embodiments, curing of the resin will be performed by applying radiation through the tool. In such instances, the tool should be sufficiently transparent to permit irradiation of the resin therethrough. Illustrative examples of materials from which tools for such embodiments can be made include polyimide, polyacrylate, polyolefin, polycarbonates, and cured urethane acrylates. Metal tools are typically preferred, however, as they can be formed in desired shapes, are durable, and also can provide excellent optical surfaces in the substrate.

A flowable resin is applied to the molding surface of the tool. The resin should be such that it flows, optionally with applied vacuum, pressure, or mechanical means, into areas and/or cavities in the molding surface. It is preferably applied in sufficient quantity that it at least substantially fills the cavities and/or surrounds projections on the molding surface.

The method of the disclosure also includes a step of releasing the cavity arrays from the surface of the template structure. Generally, the step of removing the moldable material from the surface of the template structure will be carried out in such a way as to permit the moldable material to maintain a shape that is fully complementary to the template structure, and thus, the moldable material is removed from the surface of the template structure in the form of the microstructured layer.

Although the cavity array articles are characterized as having substantially unchanged features, it will be understood that the articles are not required to be rigid or retain structural memory beyond that of maintaining the shape of the features. The flexible cavity array articles can be stored in a compact form, such as in rolled form on a spool, as stacked sheets, or any other configuration for convenient storage.

Figure 5:
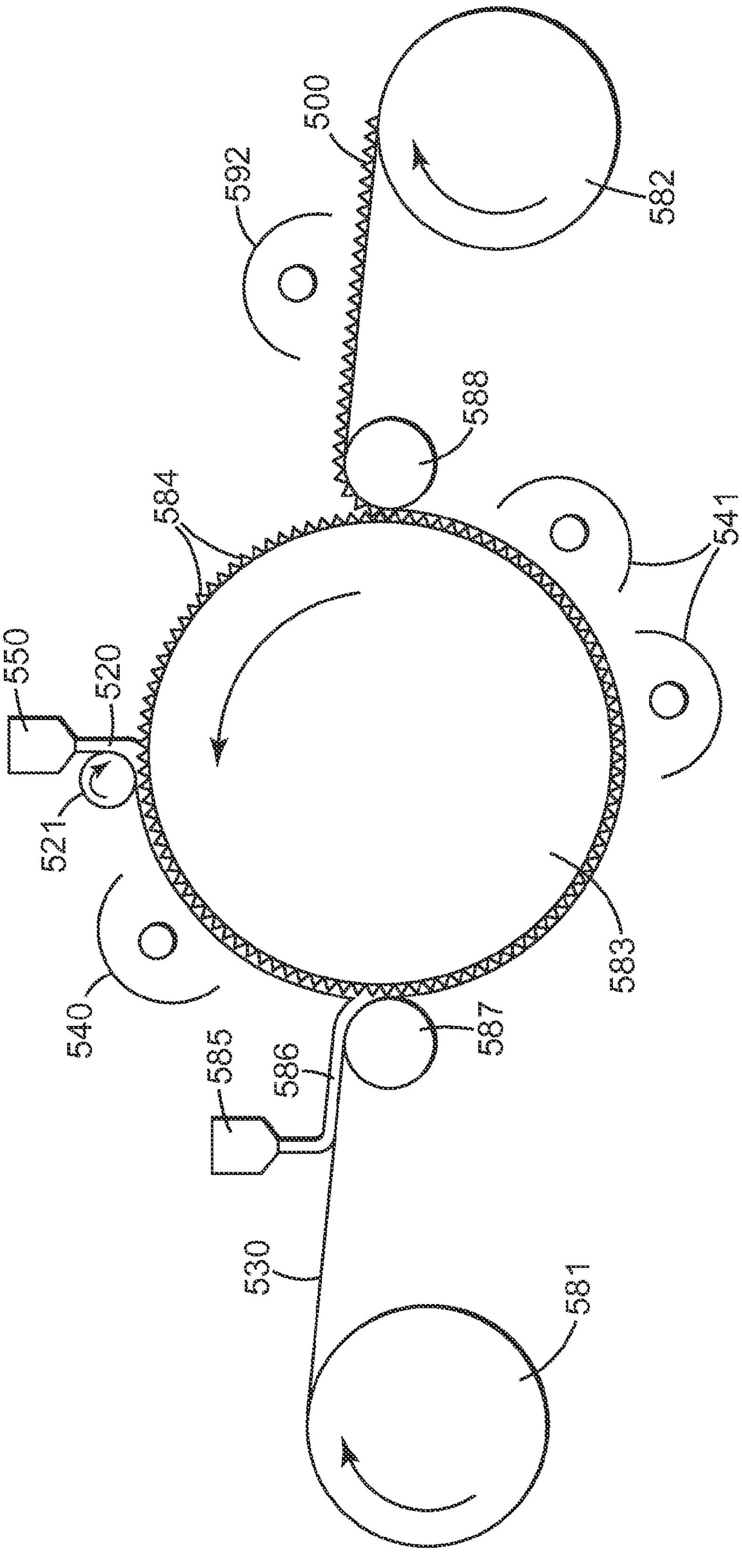
FIG. 5 shows a schematic side view of a process for a light control film.

FIG. 5 shows a schematic side view of a process for making an LCF according to one aspect of the disclosure. An optional first portion of a resin composition 520 is extruded and passes through an optional first resin hopper 550 which is brought into close proximity to a first rubber roll 521. The first rubber roll 521 rotates in a clockwise motion and nips against a patterned tool roll 583 which can be temperature controlled. The patterned tool roll 583 includes a plurality of microstructured projections 584. The patterned tool roll 583 can be mounted on a mandrel that rotates in a counterclockwise direction as shown. The optional first portion of resin composition 520 from optional first resin hopper 550 can at least partially fill the microstructured projections 584. The partially filled microstructured projections 584 can then be precured with an optional first radiation source 540. The optional first radiation source 540 can be any suitable radiation source including, for example, an array of light emitting diodes (LEDs).

An optically-transmissible flexible layer 530 (for example, a polymeric film) is threaded from an unwind idler 581, over a first nip roller 587, around a portion of the patterned tool roll 583 including microstructured projections 584, around a portion of a second nip roller 588, and onto a rewind idler 582. A second portion of a resin composition 586 is cast from a second resin hopper 585 directly onto the optically transmissible flexible layer 530 at a location proximate the patterned tool roll 583. The resin/flexible layer combination is then contacted with the patterned tool roll 583 with pressure being applied through appropriate setting (described below) of first nip roller 587. Pressure applied to the first nip roller 587 serves to control the amount of resin extending between the microstructured projections 584 of patterned tool roll 583 and the optically-transmissive flexible layer 530, allowing control of the thickness of the bottom wall (that is, the land region 229 shown, for example, in FIG. 2B) of the cavities formed by the microstructured projections 584. The resin composition 586 is cured by exposure to actinic radiation from a first radiation source 541, which may include a plurality of radiation-emitting bulbs, for example. The cured cavity array article 500 is pulled out of the patterned tool roll 583 at second nip roller 588 and collected onto the rewind idler 582. In some embodiments, an optional second radiation source 592 is positioned to direct radiation onto the microstructured side of the cavity array article 500 to complete the curing process.

In some embodiments, the patterned tool roll 583 may be heated to modulate the viscosity of the resin composition 586, thereby providing an additional means to control the thickness of the bottom wall.

In choosing the polymeric components of the present disclosure, it can be important to select compatible polymeric materials for the microstructured layer and flexible layer. A preferred aspect of compatibility is that the material of the resin composition of the microstructured layer be capable of bonding to the optically-transmissive flexible layer when cured. In certain preferred embodiments, a major surface of the optically-transmissive flexible layer is surface-treated to promote bonding with the cured polymer that forms the microstructured layer. Suitable surface treatments include, for example, radiation treatments, corona discharge treatment (for example, air or nitrogen corona discharge), flame treatment, plasma treatment, high energy UV treatment (for example, flashlamp treatments), and chemical priming treatment (for example chemical reactive coatings).

Resins selected for use in the array of cavities preferably yield resultant products that provide highly efficient transmission of light to a detection device or system, as well as sufficient durability and chemical stability. Illustrative examples of suitable polymers include a resin selected from the group consisting of acrylic-based resins derived from epoxies, polyesters, polyethers, and urethanes; ethylenically unsaturated compounds; aminoplast derivatives having at least one pendant acrylate group; polyurethanes (polyureas) derived from an isocyanate and a polyol (or polyamine); isocyanate derivatives having at least one pendant acrylate group; epoxy resins other than acrylated epoxies; and mixtures and combinations thereof. Polymers such as poly(carbonate), poly (methylmethacrylate), polyethylene terephthalate, aliphatic, polyurethane, and cross-linked acrylate such as mono- or multifunctional acrylates or acrylated epoxies, acrylated polyesters, and acrylated urethanes blended with mono- and multi-functional monomers are typically preferred.

These polymers are typically preferred for one or more of the following reasons: high thermal stability, environmental stability, and clarity, excellent release from the tooling or mold and high receptivity for receiving a coating.

Other illustrative examples of materials suitable for forming the microstructured elements are reactive resin systems capable of being cross-linked by a free radical polymerization mechanism by exposure to actinic radiation, for example, electron beam, ultraviolet light, or visible light. Radiation-initiated cationically polymerizable resins also may be used. Reactive resins suitable for forming the microarray elements may be blends of photoinitiator and at least one compound bearing an acrylate group. Preferably the resin blend contains a monofunctional, a difunctional, or a polyfunctional compound to ensure formation of a cross-linked polymeric network upon irradiation. Chemical-mediated polymerizable resins may be used (for example, these may be polymerized by thermal means with the addition of a thermal initiator such as benzoyl peroxide). U.S. Pat. Nos. 6,395,124 and 6,692,611, disclose exemplary photoinitiators that are suitable for free radical initiation of polymerization using wavelengths of light that are in the visible range (for example, longer than 400 nm).

Illustrative examples of resins that are capable of being polymerized by a free radical mechanism that can be used herein include acrylic-based resins derived from epoxies, polyesters, polyethers, and urethanes, ethylenically unsaturated compounds, aminoplast derivatives having at least one pendant acrylate group, isocyanate derivatives having at least one pendant acrylate group, epoxy resins other than acrylated epoxies, and mixtures and combinations thereof. The term acrylate is used here to encompass both acrylates and methacrylates. U.S. Pat. No. 4,576,850, discloses examples of crosslinked resins that may be used in cavity arrays of the present disclosure.

Ethylenically unsaturated resins include both monomeric and polymeric compounds that contain atoms of carbon, hydrogen and oxygen, and optionally nitrogen, sulfur, and halogens may be used herein. Oxygen or nitrogen atoms, or both, are generally present in ether, ester, urethane, amide, and urea groups. Ethylenically unsaturated compounds preferably have a molecular weight of less than about 4,000 and preferably are esters made from the reaction of compounds films containing aliphatic monohydroxy groups, aliphatic polyhydroxy groups, and unsaturated carboxylic acids, such as acrylic acid, methacrylic acid, itaconic acid, crotonic acid, iso-crotonic acid, maleic acid, and the like. Such materials are typically readily available commercially and can be readily polymerized.

Some illustrative examples of compounds having an acrylic or methacrylic group that are suitable for use in the disclosure are listed below:

(1) Monofunctional compounds: ethylacrylate, n-butylacrylate, isobutylacrylate, 2-ethylhexylacrylate, n-hexylacrylate, n-octylacrylate, isooctyl acrylate, bornyl acrylate, tetrahydrofurfuryl acrylate, 2-phenoxyethyl acrylate, and N,N-dimethylacrylamide;

(2) Difunctional compounds: 1,4-butanediol diacrylate, 1,6-hexanediol diacrylate, neopentylglycol diacrylate, ethylene glycol diacrylate triethyleneglycol diacrylate, tetraethylene glycol diacrylate, and diethylene glycol diacrylate; and (3) Polyfunctional compounds: trimethylolpropane triacrylate, glyceroltriacrylate, pentaerythritol triacrylate, pentaerythritol tetraacrylate, and tris(2-acryloyloxyethyl)isocyanurate.

Preferably, blends of mono-, di-, and polyfunctional acrylate containing materials are used. One skilled in the art will understand that varying the ratios among these components will determine the mechanical properties of the fully cured material.

Some representative examples of other ethylenically unsaturated compounds and resins include styrene, divinylbenzene, vinyl toluene, N-vinyl formamide, N-vinyl pyrrolidone, N-vinyl caprolactam, monoallyl, polyallyl, and polymethallyl esters such as diallyl phthalate and diallyl adipate, and amides of carboxylic acids such as N,N-diallyladipamide.

Illustrative examples of photopolymerization initiators that can be blended with acrylic compounds in cavity array articles of the present disclosure include the following: benzil, methyl o-benzoate, benzoin, benzoin ethyl ether, benzoin isopropyl ether, benzoin isobutyl ether, etc., benzophenone/tertiary amine acetophenones such as 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyl-diphenylphosphine oxide, phenyl-bis(2,4,6-trimethylbenzoyl)phosphine oxide, 2,4,6-trimethylbenzoylphenyl phosphinate, 2-methyl-1-4(methylthio), phenyl-2-morpholino-1-propanone, bis(2,6-dimethoxybenzoyl) (2,4,4-trimethylpentyl)phosphine oxide, etc. The compounds may be used individually or in combination.

Cationically polymerizable materials including but are not limited to materials containing epoxy and vinyl ether functional groups may be used herein. These systems are photoinitiated by onium salt initiators, such as triarylsulfonium, and diaryliodonium salts.

Preferably, the optically-transmissive flexible layer used in the method of the present disclosure is a polymeric material selected from the group consisting of PC (polycarbonate), PET (polyethylene terephthalate), PEN (polyethylene naphthalate), HDPE (high density polyethylene, LDPE (low density polyethylene), LLDPE (linear low density polyethylene), other light transmissive elastomer, and combinations thereof.

PC, PET, and PEN are particularly preferred. Such materials typically impart desired durability, flexibility, and light transmissivity to the resultant cavity array articles, while permitting desired bonding with the microstructured layer.

The optically-transmissive flexible layer preferably includes a polymer having a glass transition temperature greater than about 70° C. and a modulus about $3\times10^9$ Pa or greater. The polymer preferably is such that the optically-transmissive flexible layer retains its physical integrity under the conditions it is exposed to as the resultant cavity array is formed. The optically-transmissive flexible layer should be light transmissive and preferably is substantially transparent. For instance, films with a matte finish that become transparent when the resin composition is applied thereto, or that only become transparent during the fabrication process, for example, in response to the curing conditions, are useful herein.

The optically-transmissive flexible layer may be either a single layer or multi-layer component as desired. If multilayer, the layer to which the microstructured layer is bonded should have the properties described herein as useful in that regard with other layers not in contact with the microstructured layer having selected characteristics (for example, antireflective, optical transmissivity) as necessary to impart desired characteristics to the resultant cavity array. Advantageously, multilayer films may impart significant structural integrity (for example, tear-resistance) to the cavity array articles. Further, the films used in a multi-layer construction can be selected to transmit and/or reflect selected wavelengths of light.

The optically-transmissible flexible layer can be from about 2 microns to about 250 microns thick, or from about 2 microns to about 125 microns thick, or from about 2 microns to about 50 microns thick, or from about 4 microns to about 25 microns thick, or from about 2 microns to about 12 microns thick. Preferred materials for the optically-transmissive flexible layer include polycarbonate (PC), polyethylene naphthalate (PEN) and polyethylene terephthalate (PET). Preferably, the optically-transmissive flexible layer is available in roll form, to be used in a process as shown in FIG. 5.

Colorants, processing aids such as antiblocking agents, releasing agents, lubricants, and other additives may be added to one or both of the microstructured layer and optically-transmissive flexible layer if desired. The colorant may include a dye that is dissolved in the resin composition from which the microstructured layer is formed. Alternatively, or additionally, the colorant may include a pigment that is uniformly dispersed in the resin from which the microstructured layer is formed. The particular colorant selected depends on the desired transmissivity (and/or nontransmissivity) for particular colors of light; colorants typically are added at about 0.01 to 5.0 weight percent. Preferred colorants do not substantially interfere with observation of a display that are conducted through the cavities of the LCF.

The amount of a colorant added to the resin from which the microstructured layer or in a coating that is applied to the microstructured layer can be adjusted depending upon one or more of the following parameters: the light-absorbing properties of the colorant, the distance between the closest adjacent cavities, and the thickness of the bottom wall of the cavities. It will be recognized by a person of ordinary skill in the relevant art that, as the concentration of the colorant increases, the amount of light absorbed by the microstructured layer will increase.

Microstructured layers containing high concentrations of colorant will absorb relatively more light and, thus, will permit relatively closer spacing of the cavities. In these embodiments, however, the bottom wall should be proportioned relatively thinner, in order to permit the transmission of substantially all of the light from the cavity through the bottom wall.

In contrast, microstructured layers containing lower concentrations of colorant will absorb relatively less light and, thus, will require relatively greater spacing of the cavities in order to prevent light from passing laterally through the microstructured layer from one cavity to an adjacent cavity. In these embodiments, however, the bottom wall may be proportioned relatively thicker and still permit the transmission of substantially all of the light from the cavity through the bottom wall.

In some embodiments, prior to the step of contacting the molding surface of the tool with a flowable material, a releasing agent is applied to the surface of the tool. As used herein a "releasing agent" is any compound, composition, or other substance, which aids in the separation of the moldable material from the surface of the tool in forming an article. Useful releasing agents include silicone oil, polyvinyl alcohol, fluorinated silane or other known releasing agent. Selection of the type and amount of a releasing agent will depend on several easily determinable factors such as compatibility with reactions that are conducted in the resultant cavity array, the strength of the tool, the curable resin composition, the environmental conditions of the contacting and molding process, the degree of tolerance for distortions or imperfections in the article, and the like.

In some embodiments, in addition to the steps described above, the process for making a cavity array article further includes a step to remove (for example, by ablation or etching) a portion of the microstructured layer and/or the optically-transmissive flexible layer. In these embodiments, the cavity array article is subjected to a process that selectively removes material from at least one surface (for example, the first major surface, the second major surface, or both the first and second major surfaces) of the cavity array article.

Thus, in some embodiments, wherein the ablation or etching step is applied only to the first major surface of the article, the relatively thin bottom wall of each cavity can be selectively removed from the article, thereby causing the optically-transmissive flexible layer to form the bottom of each cavity in the array. Advantageously, this process can provide for better recovery of light transmitted from the interior of individual cavities, especially when high concentrations of colorant are used.

In alternative embodiments, wherein the ablation or etching step is applied only to the second major surface of the article, a portion of a relatively thick optically-transmissive flexible layer can be uniformly removed to produce a thinner optically-transmissive flexible layer. When both the first and second major surfaces of the article are subjected to the ablation process, the resultant cavity array articles can have increased light transmission from the cavities.

Processes for controllably ablating thin layers of flexible polymeric films are known in the art and include, for example, plasma treatment, reactive ion etching, laser ablation, or chemical etching (for example, using hydrolytic agents, such as a solution containing 40% w/v potassium hydroxide and 20% w/v ethanolamine to chemically etch PET film).

The surface of the array substrate may be coated with a thin layer of material to enhance the properties and functions of the cavities. Desirable properties of the coating can include durability and such optical properties as reflectivity.

The coating may be deposited on the surface of the array (that is, the area lying outside the cavities), on the bottom walls of a cavity, and/or on the side walls of a cavity. In one embodiment, the thin film is deposited on the entire substrate. In another embodiment, the coating is deposited on the surface of the array. In a further embodiment, the coating is deposited on the bottom wall of each cavity. In a further embodiment, the coating is deposited on the side walls of each cavity. In some embodiments, the coating is deposited on the bottom wall and side walls of each cavity and on the surface of the substrate.

The term “coating” refers to a relatively thin composition (for example, a film) with a thickness that is significantly smaller than other characteristic dimensions of the substrate. In a preferred embodiment, the coating is uniform and conformal to the microstructured layer, with a thickness of about 25 to about 1000 nanometers. The thickness of the coating may be non-uniform over the surface of the array. For example, in one embodiment, the thickness of the thin film coating can be about 50-500 nm on the top surface of the array substrate; about 25-250 nm on the side walls of the cavities, and about 50-500 nm on the bottom walls of the cavities.

Many different types of materials can be used as a coating. The composition of a coating material will depend on the array material, the application, and the method of coating deposition. In one embodiment, a coating is a polymer (for example, an inorganic polymer). A coating can be a nonmetal oxide (for example silicon dioxide ($SiO_2$)). Other coatings may be, for example, a metal alloy, a metal or semiconductor oxide, nitride, carbide or boride. Other materials for coating the substrate may include gold layers (for example 24 karat gold). Many coatings are commercially available.

Optical Isolation

The present disclosure provides for arrays of cavities that are optically isolated in an X-Y plane and optically transmissive in a Z axis. The cavities can be optically isolated by a variety of means described herein. In some embodiments, the means for optically-isolating cavities in an array includes dispersing or dissolving a colorant in the microstructured layer. In some embodiments, the colorant is dissolved or uniformly dispersed in the material (for example, plastic polymer) from which the microstructured layer is formed.

The colorant may be a pigment or a dye that absorbs a selected wavelength or a selected band of wavelengths (for example, a particular color or set of colors or the entire spectrum of visible wavelengths) of light. In one particular embodiment, a uniform broad absorbance over a wide color spectrum of light can be preferred, such as over the entire human visible spectrum. Uniformly broad absorbance over the visible spectrum can be beneficial for uses where the light control film is associated with a full-color information bearing structure such as an image or a display, since a color balance of the image or display is not adversely affected by a selective absorption. In some cases, a broad absorbance can be achieved by combining complimentary colors from two or more dyes or pigments. It can be preferable to minimize the absorbance in the ultraviolet spectrum, such that curing of the resin is not unduly inhibited. Nonlimiting examples of suitable colorants can include, for example, carbon black, fuchsin, carbazole violet, and Foron Brilliant Blue.

Suitable colorants described herein belong to a variety of dye classes. Nonlimiting examples of suitable dye classes include anthraquinone dyes (for example, 1,5-bis[(1-methylethyl)amino)]-9,10-Anthracenedione and 1-(hexylamino)-4-hydroxy-9,10-Anthracenedione); bis(trifluoromethanesulfonyl)methylene merocyanine dyes (for example, 4-[4,4-bis[(trifluoromethyl)sulfonyl]-1,3-butadien-1-yl]-Benzenamine, 4,4'-[4,4-bis[(trifluoromethyl)sulfonyl]-1,3-butadienylidene]bis[N,N-dimethyl-Benzenamine, and 4-[4-[4,4-bis[(trifluoromethyl)sulfonyl]-1,3-butadien-1-Morpholine); p-(tricyanovinyl) arylamine dyes (for example, 2-[4-(dibutylamino)phenyl]-1,1,2-Ethenetricarbonitrile); merocyanine dyes (for example, 2-[(1-methyl-4(1H)-quinolinylidene)methyl]-5-nitro-Benzonitrile); and indoaniline (indophenol) dyes (for example, 4-[[4-(dimethylamino)phenyl]imino]-1(4H)-Naphthalenone and 4-[[4-(diethylamino) phenyl]imino]-1(4H)-Naphthalenone). Numerous subclasses of merocyanine dyes, with appropriate absorption spectra, are suitable as colorants according to the present disclosure.

In some embodiments, the colorant may be a pigment or a dye that permits the transmission of a selected wavelength or a selected band of wavelengths (for example, ultraviolet wavelengths) of light. In some embodiments, the colorant may be a pigment or a dye that absorbs a selected wavelength or a selected band of wavelengths (for example, visible wavelengths) of light and permits the transmission of a different selected wavelength or a selected band of wavelengths (for example, ultraviolet wavelengths) of light. Exemplary colorants that absorb visible wavelengths of light and permit the transmission of ultraviolet wavelengths of light are fuchsin and violet pigment 9S949D, available from Penn Color, Doylestown, Pa. Articles of the present disclosure may include a colorant. The colorant may include a pigment, a dye, a mixture of pigments, a mixture of dyes, or a combination of any two of the foregoing. In some embodiments, the colorant includes a nonionic colorant.

Resin compositions of the present disclosure can include a colorant. In some embodiments, the resin composition can be polymerized using actinic radiation (for example, u.v. and/or near-u.v. wavelengths of light). Excessive absorption of the actinic radiation can reduce the efficiency of the polymerization process. Thus, in some embodiments, it may be desirable to select a colorant that does not substantially affect the polymerization process of the resin composition (for example, a colorant that is substantially transmissive for u.v. and/or near-u.v. wavelengths).

In certain preferred embodiments, the colorant does not substantially interfere with the flow of the resin composition into and/or onto the microreplication tool. The present disclosure provides suitable intensely-colored resin compositions that are unimpeded in flow into the microreplication mold, as compared to the uncolored resin compositions.

Thus, in some embodiments, it is desirable to select a colorant that is substantially transmissive for one range of wavelengths of light (for example, u.v. and or near-u.v. wavelengths) and substantially absorptive of another range of wavelengths of light (for example, ranges of visible wavelengths).

Further, it is desirable to select a colorant that has a high enough solubility in the resin composition to achieve the light absorptive properties without substantially degrading the properties of the polymer and/or substantially interfering with a component. For example, the resin composition including the colorant may absorb about four times as much light in the 480-615 nm range than it absorbs in the 375-450 nm range. Preferably, the resin composition including the colorant may absorb more than four times as much light in the 480-615 nm range than it absorbs in the 375-450 nm range.

Thus, there are two factors that can guide the selection of a colorant for use in articles according to the present disclosure: the Absorbance Ratio (A*), which indicates the ability of the resin/colorant mixture to absorb the wavelengths of light; and the Absorbance fraction (F), which indicates the ability of the resin/colorant mixture to transmit the wavelengths of light used to cure the resin composition (in this example, a wavelength of about 400 nm). Broadly, both A* and F can be calculated for any two substantially non-overlapping ranges of wavelengths. As an illustrative example, both factors are defined below with respect to a wavelength (400 nm) that is useful for curing a polymer composition and two wavelengths (550 nm and 600 nm) that fall within a range of visible wavelengths:

$$A^*=(A_{550}+A_{600})/2 \text{ where}$$

$A_{550}$=light absorbance at 550 nm, $A_{600}$=light absorbance at 600 nm, and
A=−log(fraction of light transmitted)

$$F=(2\times A_{400})/(A_{550}+A_{600}) \text{ where}$$

$A_{400}$=light absorbance at 400 nm, $A_{550}$=light absorbance at 550 nm, $A_{600}$=light absorbance at 600 nm, and A=−log(fraction of light transmitted)

A higher A* factor indicates that the resin composition including a colorant is absorbing more light in the visible light (550-600 nm in this example) and, therefore, allows less optical cross-talk between adjacent cavities. A lower F factor indicates that the resin composition is permitting more near-u.v. light (400 nm in this example) relative to visible light (550-600 nm in this example) and, therefore allows good curing of the polymer while also absorbing light in the longer visible wavelengths.

In some embodiments, the colorant in the monomer mixture provides an Absorbance Ratio (A*) of about 0.3 or greater; preferably, an A* of 0.5 or greater; more preferably an A* of 1.0 or greater; even more preferably an A* of 1.5 or greater, and even more preferably, an A* of 2.0 or greater in a microstructured layer with a thickness of 5 microns. In some embodiments, the colorant in the monomer mixture provides an Absorbance Ratio (A*) of about 0.3 or greater; preferably, an A* of 0.5 or greater; more preferably an A* of 1.0 or greater; even more preferably an A* of 1.5 or greater, and even more preferably, an A* of 2.0 or greater in a microstructured layer with a thickness of 10 microns. The preferred mixtures allow rapid photopolymerization of the resin composition, while keeping the colorant molecularly dispersed in the article after polymerization.

In some embodiments, the colorant in the monomer mixture provides a Absorbance fraction (F) of 0.25 or less, preferably 0.10 or less.

It will be recognized by a person of ordinary skill in the relevant art that the principles embodied by A* and F can be applied to other selected wavelengths for photocuring and the Examples described below are merely exemplary of the way these factors can be used to select combinations of colorants with specific desirable attributes.

Optical cross-talk between adjacent cavities can be minimized by several factors including, for example, an optically nontransmissive colorant dispersed in the microstructured layer, an optically nontransmissive coating on the sidewalls of the cavities, relatively thin bottom walls in the cavities, relatively thin optically-transmissive flexible layers, increasing the spatial separation of the cavities, and any combination of two or more of the foregoing factors. Optical cross-talk can also be affected by the density and cross-sectional area of the individual image pixels, relative to the cross-sectional area of the individual cavities.

The invention will be further illustrated by reference to the following non-limiting Examples. All parts and percentages are expressed as parts by weight unless otherwise indicated.

EXAMPLES

All parts, percentages, ratios, etc. in the examples are by weight, unless noted otherwise. Solvents and other reagents used were obtained from Sigma-Aldrich Chemical Company; Milwaukee, Wis. unless specified differently.

Materials 3M 8402: a tape obtained from 3M Company, St. Paul, Minn.

3M 8403: a tape obtained from 3M Company, St. Paul, Minn.

Carbon black paste #9B898: 25% carbon black paste obtained from Penn Color, Doylestown, Pa.

Carbazole violet dispersion 9S949D obtained from Penn Color, Doylestown, Pa.

Darocur 1173: 2-hydroxy-2-methylprophenone obtained from Ciba Specialty Chemicals, Basel, Switzerland.

Darocur TPO: diphenyl (2,4,6-trimethylbenzoyl) phosphine oxide obtained from Ciba Specialty Chemicals, Basel, Switzerland.

Desmodur W: a diisocyanate, sometimes referred to as H12MDI or HMDI, obtained from Bayer, Pittsburgh, Pa.

Dytek A: an organic diamine obtained from Invista, Wilmington, Del.

EGC-1720: a fluorocarbon solution obtained from 3M Company, St. Paul, Minn.

Fluorescebrite Plain Microspheres: Fluorescent beads obtained from Polysciences, Inc. Warrington Pa.

Irgacure 819: phenyl-bis-(2,4,6-trimethyl benzoyl) phosphine oxide obtained from Ciba Specialty Chemicals, Basel, Switzerland.

Kapton H: a polyimide film obtained from DuPont, Wilmington, Del.

Loparex 10256: a fluorosilicone treated PET release liner obtained from Loparex, Willowbrook, Ill.

Lucirin TPO-L: 2,4,6-trimethylbenzoylphenyl phosphinate obtained from BASF, Luwigshafen, Germany.

Melinex 453: a 25 micron (1 mil) thick polyester film, which is adhesion treated on one side, obtained from Dupont, Wilmington, Del.

Photomer 6010: obtained from Cognis, Monheim, Germany

Photomer 6210: obtained from Cognis, Monheim, Germany

Photomer 6602: obtained from Cognis, Monheim, Germany

Scotchcast Electrical Resin #5: a resin obtained from 3M Company, St. Paul, Minn.

SilFlu 50MD07: A release liner available from SilicoNature USA, LLC, Chicago, Ill.

SR238: 1,6 hexanediol diacrylate obtained from Sartomer, Inc., Exton Pa.

SR339: 2-phenoxy ethyl acrylate obtained from Sartomer, Inc., Exton Pa.

SR545: an MQ resin obtained from Momentive Performance Materials, Albany, N.Y.

SR9003: obtained from Sartomer, Inc., Exton Pa.

Teonex Q71: a six micron thick poly(ethylene naphthalate), or PEN, film obtained from Dupont-Teijin, Chester, Va.

Vitel 1200B: a copolyester resin obtained from Bostik, Wauwatosa, Wis.

Violet 9S949D: a violet paste containing 20% pigment solids obtained from Penn Color, Doylestown, Pa.

Microreplication Tooling I

Examples 1-16

Tooling was prepared by a laser ablation process according to the procedure discussed in U.S. Pat. No. 6,285,001. Tool A was constructed by coating a urethane acrylate polymer (Photomer 6602) to an approximately uniform thickness of 165 microns onto an aluminum backing sheet as described in Unites States Patent Application Publication No. 2007/0231541, followed by ablating the coating to produce a hexagonally packed array of posts. The resulting posts had a center to center distance of 42 microns. Each post included a circular top having a diameter of 27 microns, a sidewall angle of approximately 10 degrees, and a height of 39 microns. Tool B was constructed by ablating a 125 micron thick Kapton H polyimide film to construct posts having a hexagonally packed array of posts. The resulting posts had a center to center distance of 34 microns and each post included a circular top having a diameter of 27 microns, a sidewall angle of approximately 10 degrees, and a height of 34 microns. Tool C was constructed from Photomer 6602 in the same way as Tool A to make a hexagonally packed array of posts with center to center distance of 34 microns. Each post included a circular top having a diameter of 27 microns, a sidewall angle of approximately 10 degrees, and a height of 34 microns.

Tooling Surface Treatments

The polymer Tool A was first plasma treated using an apparatus described in detail in U.S. Pat. No. 5,888,594. The polymer tool was mounted onto the cylindrical drum electrode and the chamber was pumped down to a base pressure of $5\times10^{-4}$ Torr. Argon gas was introduced into the chamber at a flow rate of 500 sccm (standard cubic centimeters per minute) and plasma ignited and maintained at a power of 500 watts for 30 seconds. After the argon plasma treatment, tetramethylsilane vapor was introduced into the chamber at a flow rate of 360 sccm and the plasma sustained at a power of 500 watts for 30 seconds. After the plasma treatment in tetramethylsilane vapor, oxygen gas was introduced into the chamber at a flow rate of 500 sccm and plasma sustained at a power of 500 watts for 60 seconds. The pressure in the chamber during these plasma treatment steps was in the 5-10 mTorr range. The plasma chamber was then vented to atmosphere and the treated tool was dipped in EGC-1720 fluorocarbon solution. The treated tool was heated in an oven at 120 C for 15 minutes. Tool C was treated in the same way as Tool A.

The polymer Tool B was plasma treated using an apparatus described in detail in U.S. Pat. No. 5,888,594. The polymer tool was mounted onto the cylindrical drum electrode and the chamber was pumped down to a base pressure of $5\times10^{-4}$ Torr. Argon gas was introduced into the chamber at a flow rate of 500 sccm and plasma ignited and maintained at a power of 500 watts for 30 seconds. After the argon plasma treatment, tetramethylsilane vapor was introduced into the chamber at a flow rate of 360 sccm and the plasma sustained at a power of 500 watts for 30 seconds.

Resin Preparation

Resin formulations were prepared as follows.

Solution A: 1125 grams of Photomer 6210, 375 grams of SR238 and 15 grams of Darocur 1173 were combined in a glass jar. Solution B: 3.75 g of Irgacure 819 was added to SR339 followed by roller mixing overnight to dissolve the Irgacure 819. Solution C, 3.75 grams of Irgacure 819 was added to 187.5 grams of SR 238 followed by roller mixing 18 hours to dissolve the Irgacure 819. Solution D: solutions A, B, and C were combined in a glass jar followed by mixing. To this was added Darocur 1173 (3.7 g) and Darocur TPO (32 g) followed by roller mixing for 30 minutes.

Solution E: Solution D (708 g) was placed in an amber glass jar. Carbon black paste #9B898 (97 g) was added to the solution and roller mixed for 18 hours to provide a resin formulation with a final carbon black concentration of 3%.

Solution F: Solution D (466 g) was placed in an amber glass jar. Carbon black paste #9B898 (40.5 g) was added to the solution and roller mixed for 18 hours to provide a resin formulation with a final carbon black concentration of 2%.

Solution G: Solution D (466 g) was placed in an amber glass jar. Carbon black paste #9B898 (19.4 g) was added to the solution and roller mixed for 18 hours to provide a resin formulation with a final carbon black concentration of 1%.

Solution H: Solution D (708 g) was placed in an amber glass jar. Violet 9S949D (121 g) was added to the solution and roller mixed for 18 hours to provide a resin formulation with a final violet pigment concentration of 3%.

Solution I: Into a 500 mL glass jar was placed 99.00 g of SR238 (1,6 hexanediol diacrylate) and 10.00 g of SR339. To the solution was added 5.94 g of oil blue A (solvent blue 36) and 5.94 g of solvent violet 37 and the composition was mixed to disperse/dissolve the dyes. The mixture was centrifuges and the supernatant (193.85 g) was recovered. 0.68 g of Irgacure 819 and 3.30 g of Lucirin TPO-L was added to the supernatant. The jar was then capped and placed in a shaker for mixing overnight. Most of the dye appeared to be dissolved in the acrylates. Subsequently, to the solution was added 90.00 g. of the base resin with Photomer 6210. The solution was subjected to a further mixing in a shaker for 1 hour. A homogeneous blue-colored solution was obtained.

Examples 1-5

Microreplication was performed using a UV curing process as described in PCT Publication No. WO 9511464, and described above. Unless noted otherwise, the UV cure process used in these examples did not include the optional second radiation source described in FIG. 5.

Tool A, having a patterned area of approximately 7 inches by 36 inches (17.8 cm by 91.4 cm), was secured to a mandrel having an approximate diameter of 37 inches (94 cm) using 3M 8402 adhesive tape. The Melinex 453 film was threaded from the unwind idler, along the surface of the Tool A, to the rewind idler as shown in FIG. 5. The surface-treated (adhesion-promoting) side of the film was facing the tool. The mandrel was heated to 54 C (130 F). The film was run at a line speed of 10 cm/s (20 feet per minute) at a nip pressure of 207 kPa (30 psi) at the contact point of the first nip roller (a 95 Shore D nitrile rubber roller) and the mandrel. Resin was applied to the film by manually pouring a small continuous bead of resin solution on the film at the hopper location upstream from the mandrel as depicted in FIG. 5. The resin spread laterally across the width of the tool at the rubber nip roller, forming a bank of solution approximately 9 inches (22.9 cm) wide. Resin solutions E, F, and G were used in Examples 1, 2, and 3, respectively. Resins were cured using radiation from Fusion D lamps (available from Fusion UV Systems, Gaithersburg, Md.). The Fusion D lamps were operated at an input power of 236 watts per cm. The cured cavity array film article was removed from the tool at the second nip roller and wound on the rewind idler as shown in FIG. 5. Additional samples were made with the above procedure using Tool B instead of Tool A. Example 4 was made by using Tool B with resin solution F and Example 5 was made by using Tool B with resin solution H.

Cure depth for several examples were determined using a combination of SEM imaging and a thickness gauge and are shown in TABLE 1. It can be seen from these examples that increased photoinitiated cure depth can be accomplished by providing a tooling material that allows greater penetration of light (Example 1) or alternatively adding a wavelength specific colorant with a lower absorbance cross section in the wavelength range of the photoinitiator (Example 5).

TABLE 1

| Cure Depth | | | |
|---|---|---|---|
| Example Number | Resin Solution | Tool | Microstructure Cure Depth (microns) |
| 1 | F (3% carbon black) | A (urethane acrylate) | 39 (full cure depth) |
| 4 | F (2% carbon black) | B (polyimide) | about 12 |
| 5 | H (3% violet pigment) | B (polyimide) | 34 (full cure depth) |

Portions of selected samples were cut and dip coated using Scotchcast Electrical Resin #5. The samples were allowed to cure for at least 24 hours before microtoming. The embedded samples were thin sectioned (10-um sections) using a diamond knife. The sections were placed in 1.515 RI oil and covered with a cover slip prior to imaging. Samples were imaged by optical microscopy. A number of sections (listed as "Count" in TABLE 2) were measured to determine the average thickness of the cavity base (bottom wall, that is, land region), as shown in TABLE 2.

TABLE 2

| Thickness of material at the base of the cavities in microns | | | |
|---|---|---|---|
| | Example 3 1% carbon (G) | Example 2 2% carbon (F) | Example 1 3% carbon (E) |
| Average | 0.9 | 2.2 | 1.8 |
| Std. Dev. | 0.3 | 0.6 | 0.4 |
| CV | 0.31 | 0.27 | 0.22 |
| Minimum | 0.4 | 1.1 | 1.2 |
| Maximum | 1.4 | 3.5 | 3.0 |
| Count | 18 | 24 | 22 |

Approximately 1×1 inch (2.54 cm by 2.54 cm) samples were obtained from microstructured film examples 1-3 and Melinex 453 film. The films were placed on a 1×3 inch (2.54 cm×7.6 cm) microscope slide, with a small gap (no film) between the samples. Brightfield transmission images were obtained using a Zeiss AxioPlan 2 microscope (Plan-Neofluor 10×/0.03 objective) and a Zeiss AxioPlan 2 digital camera (8 bit). Prior to final image acquisition the light intensity was adjusted to ensure the blank area between the films was below the saturation level of the digital camera. Line scans of each image were produced using ImagePro Plus image analysis software (Media Cybernetics) across the "blank" area of the slide (the gap between the films), an area of the slide that contained just the Melinex 453 film, and an area of the slide that contained the composite article including the colorant-containing resin cured on the Melinex 453 substrate. Pixel intensities from the cavity bottoms were compared to the pixel intensities of the PET film to estimate the average percent transmission of light through the bottom walls of the cavities. The calculated results are reported in TABLE 3. It can be observed from these measurements that the thin cavity base substantially transmits light while the walls are substantially non-transmissive.

TABLE 3

| Light transmission through cavity base | |
|---|---|
| Example Number | % transmission |
| 3 (1% carbon black) | 86.9 |
| 2 (2% carbon black) | 87.9 |
| 1 (3% carbon black) | 80.2 |

Lateral light transmission through the sidewalls in the X-Y plane (see FIG. 1) of Example 1 was estimated by preparing a cured film of uniform thickness similar to the midpoint sidewall thickness in Example 1 (approximately 5 microns). A small amount of solution E was applied to a polyester film 1. This was covered with a second film 2 and manual pressure was applied to spread solution E between the films. The solution between the films was cured by passing under a UV source (500 W fusion lamp) at 7.6 cm/s (15 ft/min) with film 1 facing the UV source. Film 2 was removed and the resin adhered to film 1 on the UV-exposed side was washed to remove uncured monomer. Cured resin thickness was measured using a caliper gauge. The mean thickness was determined to be 4 microns. A portion of the film containing the cured resin was placed in a spectrophotomer (Tecan Infinite M200). Light transmission at 550 nanometers was measured at three locations. For the 4 micron film, a mean absorbance value of 1.4 was obtained, corresponding to a light transmission of 4%. This example serves to illustrate that the microstructured cavities are substantially transmissive along the Z axis and substantially nontransmissive in the X-Y plane.

Examples 6 and 7

Six micron thick Teonex Q71 film was primed on one side with a 5% solids solution of Vitel 1200B in an 85%/15% mixture of dioxolane and cyclohexanone via a slot-die coater, followed by drying in an oven at 160° F. for 2 minutes. The thickness of the coating was 300 nanometers as measured with a white light interferometer. The film was then coated on the opposite side with a silicone-polyurea adhesive which consisted of a 28% solids solution of an MQ resin (SR545) and a silicone polyurea (SPU) elastomer at a ratio of 55:45. The SPU elastomer was formed through the condensation reaction of a 33 kDa diamino terminated polydimethylsiloxane, Dytek A, and Desmodur W in a ratio of 1:1:2, as described in U.S. Pat. No. 6,824,820. The film was then dried in an oven at 160° F. for 2 minutes and laminated to a PET film by passing the material through a nip roll in contact with Loparex 10256 fluorosilicone treated PET release liner. The thickness of the coating was 4.2 microns as measured by a white light interferometer.

Example 6 was made by performing microreplication as in Examples 1-5 using the coated Teonex Q71 film in place of the Melinex 453 polyester film and by using Tool C and resin solution H. Example 7 was made as Example 6 except that resin solution I was used. In Examples 6 and 7 the Vitel 1200B-treated side of the Teonex Q71 film was positioned to face toward the replication tool. Light transmission through the cavity base of the microstructure of Example 6 was measured as described for Examples 1-3 above.

Example 8

A sample made according to Example 1 was coated with a layer of silicon dioxide as follows to produce Example 8. The silica deposition was done in a batch reactive ion plasma etcher (Plasmatherm, Model 3280). The microreplicated article was placed on the powered electrode and the chamber pumped down to a base pressure of 5 mTorr. The article was plasma treated first in an argon plasma at 25 mTorr pressure for 20 seconds. Following this, tetramethylsilane vapor was introduced at a flow rate of 150 sccm and plasma maintained at a power of 1000 watts for 10 seconds, following which, oxygen gas was added to the tetramethylsilane at a flow rate of 500 sccm with the power maintained at 1000 watts for another 10 seconds. After this step, the tetramethylsilane vapor flow rate was decreased in a stepwise manner from 150 sccm to 50 sccm, 25 sccm and 10 sccm while the plasma was still on and each of these steps lasted for 10 seconds. After the last step of tetramethylsilane vapor flow of 25 sccm, the flow was disabled and a 2% mixture of silane gas in argon was introduced instead at a flow rate of 1000 sccm with the plasma maintained at 1000 watts and treatment performed for another 60 seconds. The plasma chamber was subsequently vented to atmosphere and the plasma treated microreplicated article was removed from the chamber.

Examples 9 and 10

Cavity array articles were prepared by casting and curing solution E onto a 25 micron (1 mil) PET film as in Example 1. The PET side was exposed to a solution of potassium hydroxide (40%) containing ethanolamine (20%) to chemically etch the PET film. Etching was accomplished placing the microstructured side of a section of film (about 7.6 cm (3 inches) by 10 cm (4 inches)) against a sheet of printed circuit board material. The perimeter of the film was sealed against the board using 3M 8403 tape to prevent exposure of the solution to the structured side. The potassium hydroxide/ethanolamine solution was placed in a large glass container and heated to 80 C using a water bath. The boards with adhered films were immersed in the bath for a specified time followed by washing with water. Films etched for 3 minutes had 12 microns of remaining PET (Example 9). Films etched for 6 minutes and 10 seconds had 5 microns of PET remaining (Example 10).

Examples 11-14

A silicone adhesive was coated onto a liner at various thicknesses. The adhesive consisted of a 28% solids solution of an MQ resin (SR545) and a silicone polyurea (SPU) elastomer at a ratio of 55:45. The SPU elastomer was formed through the condensation reaction of a 33 kDa diamino terminated polydimethylsiloxane, Dytek A, and Desmodur W in a ratio of 1:1:2, as in U.S. Pat. No. 6,824,820. The liner used was SilFlu 50MD07 which uses a fluorosilicone release chemistry on clear, 50 micron (2 mil) PET. The adhesive was coated using a knife coater with a 50 micron (2 mil) wet gap. The adhesive was diluted with toluene to achieve various thicknesses. The coated liner was dried in an oven at 115° C. for six minutes.

The adhesives were then laminated to samples of cavity array articles formed on PET film according to Examples 8 and 15 using a rubber roller. The cavity structures were protected from damage with a PET film, which was then discarded. Example 11 was made by laminating 39 micron thick adhesive to the cavity array of Example 1, which had a PET film thickness of 25 microns, for a total base thickness of 64 microns. Example 12 was made by laminating 7 micron thick adhesive to the microstructure of Example 1, which had a PET film thickness of 25 microns, for a total base thickness of 32 microns. Example 13 was made by laminating 3 micron thick adhesive to the microstructure of Example 9, which had a PET film thickness of 12 microns, for a total base thickness of 25 microns. Example 14 was made by laminating 2 micron thick adhesive to the microstructure of Example 10, which had a PET film thickness of 5 microns, for a total base thickness of 7 microns.

Light spreading was measured as function of total base thickness below the microstructure (that is, the base thickness included both the PET film plus the adhesive layer). After etching and application of adhesive, sections of films were applied to a fiber optic face plate (6 micron fiber diameters, 47A glass, Schott North America). Approximately 20 ml of aqueous solution containing approximately 1000 fluorescent beads (27 micron Fluorescebrite Plain Microspheres) was placed on the microstructured side of the laminated film. Beads were allowed to settle into the base of the microstructured cavities by gravity. After the water was allowed to evaporate the laminated film/face plate assembly was placed in a fluorescence microscope (Zeiss AxioPlan 2 microscope, Plan-Neofluor 10×/0.03 objective, with fluorescein filter set) with the microstructure side facing down (away from the objective). The microscope was focused on the back side of the face plate. Images of the back side of the faceplate were acquired using a fluorescein filter set. The degree of light spread was approximated by counting the number of 6 micron fibers across the diameter of the fluorescent areas projected on the face plate. The results are shown in TABLE 4. It can be seen from this data that minimization of the base layer thickness decreases the amount of lateral light spread, which in turn minimizes optical cross talk between neighboring cavities.

TABLE 4

Approximate projected diameter of 27 micron beads

| Example Number | Base Thickness (PET + adhesive) (microns) | Number of 6 micron fibers across diameter of projected bead image | Approximate Projected diameter of 27 micron bead on faceplate (microns) |
|---|---|---|---|
| 11 | 64 | 11 | 66 |
| 12 | 32 | 8 | 48 |
| 13 | 15 | 6 | 36 |
| 14 | 7 | 5 | 30 |

Examples 15

Test for Absorbance fraction (F) of a dye: A double-beam spectrometer operative from 350 nm to 750 nm, furnished with 10.00 mm cells and spectrophotometric grade ethyl acetate was used in this Example. The reference cell contained ethyl acetate. A very small amount of a dye, dissolved in ethyl acetate, and providing a peak absorbance between 0.5 and 2.0 was placed in the sample cell. The absorbance was measured at 400 nm, 550 nm, and 600 nm. The F fraction was calculated as $2\times A_{400}/(A_{550}+A_{600})$. This ratio is a strong indicator of useful transmittance in the 375-450 nm region.

Test for coloration of a monomer mixture including a colorant: The monomer mixture (50 wt % 1,6-hexanediol diacrylate containing 0.1% TPO photosensitizer+50 wt % 6210 photomer) was combined with 1 to 5 wt % of the dye in a closed vessel with good mechanical mixing (as by rolling or end-to-end inversion). Mixing was done for 24-72 hours. The mixing vessel was subjected to centrifugation to settle undissolved material. Without separation from the pellet (if present), 1% or less of the supernatant was withdrawn and diluted 1:1000 in ethyl acetate or monomer mixture. The A* ratio and F ratio were calculated as described above.

Example 16

The following colorants (listed by their respective generic names from the Color Index published by the Society of Dyers and Colourists and the American Association of Textile Chemists and Colorists) were added to the monomer mixture (50 wt % 1,6-hexanediol diacrylate) in the weight percent ratio listed below:

| | |
|---|---|
| Disperse violet 29 | 4.00% |
| Solvent blue 36 | 1.5% |
| Solvent violet 11 | 0.6% |
| Solvent violet 37 | 0.5% |
| Disperse red 11 | 0.6% |
| Disperse red 15 | 0.8% |

After thorough mixing, the solution was diluted 1:1000 in spectrophotometric grade ethyl acetate and the absorbance was measured in a split-beam scanning spectrophotometer (reference solution was spectrophotometric grade ethyl acetate). The spectrum shows very low absorbance at 400-450 nm, an absorbance maximum at about 550 nm, and a secondary absorbance maximum (lambda #2) at about 590 nm.

Example 17

Microreplication Tooling II

Example 17

Tool mastering was prepared by a laser ablation process according to the procedure described in U.S. Pat. No. 6,285,001. To prepare the master a layer of copper 20 microns thick was applied to one side of a roll of 1.5 mil (38 micron) Kapton-H film using an electrodeposition process. The thickness of the Kapton layer was reduced to 34 microns by plasma etching in an oxygen atmosphere using an apparatus described in detail in U.S. Pat. No. 5,888,594. A section of the thinned Kapton film measuring approximately 12 inches wide by 60 inches long was mounted onto the cylindrical drum electrode and the chamber was pumped down to a base pressure of $5\times10^{-4}$ Torr. Oxygen gas was introduced into the chamber at a flow rate of 500 sccm (standard cubic centimeters per minute) and plasma ignited and maintained at a power of 500 watts for 18 minutes while rotating the drum electrode A section of film 40 inches long and 8 inches wide was ablated from the Kapton side through to the copper layer (to produce a flat well base) as described in U.S. Pat. No. 6,285,001, producing a hexagonally packed array of cavities having 34 micron diameter first circular apertures, 25 micron diameter second circular apertures, depth of 34 microns, and center-to-center spacing of 37 microns.

The flat Kapton master was converted into a nickel sleeve tool (Sleeve Tool 1) using the processes described in U.S. Patent Publication 20070231541. The flat tool was formed into a sleeve, which was utilized in the replication process shown in FIG. 5, and described below.

A second nickel tool (Sleeve Tool 2) was prepared in an analogous manner without first plasma etching the Kapton substrate resulting a hexagonally packed array of cavities having 34 micron diameter first circular apertures, 25 micron diameter second circular apertures, depth of 38 microns, and center-to-center spacing of 37 microns.

Resin Preparations

A urethane-acrylate functional polyether (Poly-1), according to the structure shown below, was prepared.

Poly-1

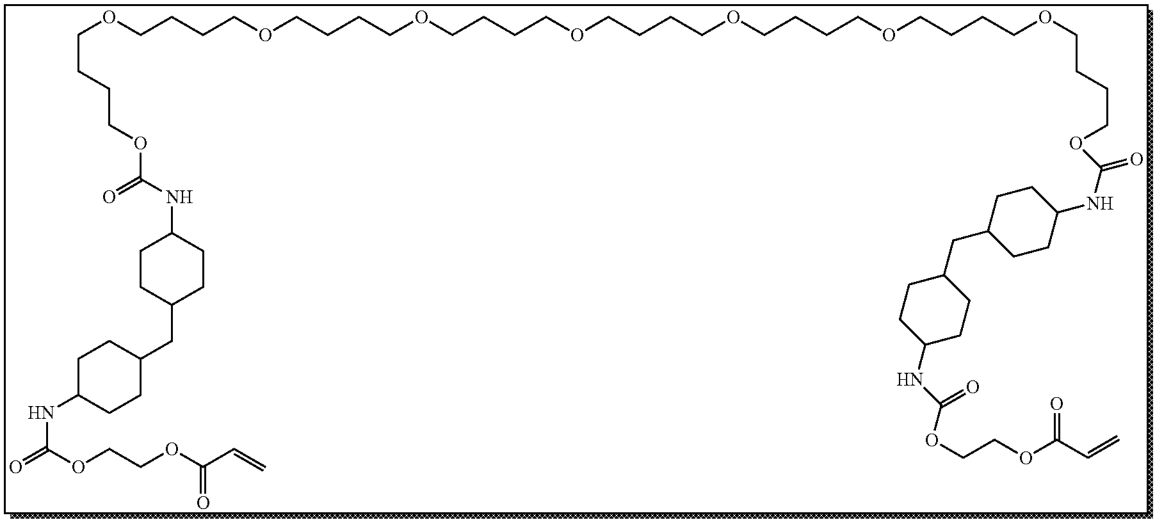

1000 grams of Terathane 1000 (available from Aldrich) was melted in an oven at 65° C., then added to a five liter, 4-neck round bottom flask equipped with a mechanical stirrer, condenser, $N_2$ cap, dry air purge, temperature probe, and heating mantle. The temperature was maintained at 65° C. Vacuum was pulled to 100 mm Hg for 30 minutes to dehydrate the material. While stirring and cooling to 45° C., 540.93 grams of Desmodur W (available from Bayer), 2.4391 grams of butylated hydroxytoluene (Aldrich), and 0.10456 grams hydroquinone monomethyl ether (Aldrich) were added.

To this mixture, 0.3835 grams of dibutyltin dilaurate (Aldrich) were added with stirring, and the heating mantle removed. The reaction exothermed to 75° C. and a water/ice bath was used to manage the exotherm to maintain this temperature. The batch reacted for one hour and was allowed to cool overnight. The following day, the solution was heated to 50° C. and dry air purged. 239.42 grams of hydroxyethyl acrylate (Aldrich) were added dropwise to the solution, and the heating mantle was again removed to control the exotherm below 75° C. Once the exotherm subsided, the reaction was allowed to run at 75° C. until no isocyanate remained as observed in an IR spectrum, about 8 hours, resulting in Poly-1.

Resin 1: 375 grams of Poly-1 were added to a 1 pint amber bottle. To this was added 50 grams Sartomer SR9003, 75 grams of carbazole violet dispersion 9S949D (Penn Color), and 1.5 grams Irgacure 819. The resultant mixture was placed on a roller mill for 24 hours with mild heat (~120° F.). After rolling, the mixture was subject to high shear mixing using an Ultra-Turrax T25 (available from Ika, Wilmington, N.C.) rotor-stator type mixer.

Resin 2: 63 grams of Poly-1 were added to an 8 ounce amber bottle. To this was added 22 grams Sartomer SR9003, 15 grams of carbazole violet dispersion 9S949D (Penn Color), and 0.5 grams Irgacure 819. The resultant mixture was subjected to high shear mixing using an Ultra-Turrax T25 (Ika) rotor-stator type mixer and then placed in an oven for 24 hours with mild heat (~120° F.).

Resin 2a: 78 grams of Photomer 6010 was added to an 8 ounce amber bottle. To this was added 7.0 grams Sartomer SR9003, 15 grams of carbazole violet dispersion 9S949D (Penn Color), and 0.5 grams Irgacure 819. The resultant mixture was placed on a roller mill for 24 hours with mild heat (~120° F.). After rolling, the mixture was subject to high shear mixing using an Ultra-Turrax T25 (Ika) rotor-stator type mixer. Later, the mixture was diluted with an additional 28 grams of SR9003 and high shear mixed a second time.

Resin 3: 74.94 grams of Poly-1 were added to an 8 ounce amber bottle. To this was added 39.25 grams Sartomer SR9003, 4.76 grams of carbon black dispersion 9B898 (Penn Color), and 0.59 grams Irgacure 819. The resultant mixture was subjected to high shear mixing using an Ultra-Turrax T25 (Ika) rotor-stator type mixer and then placed in an oven for 24 hours with mild heat (~120° F.).

Resin 3a: 74.34 grams of Poly-1 were added to an 8 ounce amber bottle. To this was added 68.39 grams Sartomer SR9003, 5.95 grams of carbon black dispersion 9B898 (Penn Color), and 0.74 grams Irgacure 819. The resultant mixture was subjected to high shear mixing using an Ultra-Turrax T25 (Ika) rotor-stator type mixer and then placed in an oven for 24 hours with mild heat (~120° F.).

Resin 4: 75 grams of Photomer 6210 was added to an 8 ounce amber bottle. To this was added 20.2 grams Sartomer SR9003, 6.1 grams of carbon black dispersion 9B898 (Penn Color), and 0.51 grams Irgacure 819. The resultant mixture was subjected to high shear mixing using an Ultra-Turrax T25 (Ika) rotor-stator type mixer and then placed in an oven for 24 hours with mild heat (~120° F.).

Resin 4a: 75 grams of Photomer 6010 was added to an 8 ounce amber bottle. To this was added 20.2 grams Sartomer SR9003, 6.1 grams of carbon black dispersion 9B898 (Penn Color), and 0.51 grams Irgacure 819. The resultant mixture was subjected to high shear mixing using an Ultra-Turrax T25 (Ika) rotor-stator type mixer and then placed in an oven for 24 hours with mild heat (~120° F.).

Microreplication

Microreplication was performed using a UV curing process as described in PCT Publication No. WO 9511464, described with reference to FIG. 5, and co-pending U.S. Patent Application No. 61/263,640. Sleeve Tool 1, having a patterned area of approximately 8 inches by 37 inches (17.8 cm by 91.4 cm), was secured to a mandrel. The tool surface was treated with a release agent as described in U.S. Pat. No. 6,824,882.

Melinex 453 film (3 mil thick) was threaded from the unwind idler, along the surface of Sleeve Tool 1, to the rewind idler as shown in FIG. 5. The surface-treated (adhesion-promoting) side of the film was facing the tool. The mandrel was heated to 54 C (150 F). The film was run at a line speed of 6 feet per minute (183 cm/min). Resin was simultaneously applied in two locations as shown in FIG. 5, that is, to the film (from second resin hopper 585) and to the tool (from optional first resin hopper 550).

Resin was supplied to the first location on the tool using a rubber contact roller (95 Shore D nitrile rubber) having a nip pressure of 60 psi at the contact point. Resin was manually delivered to the rubber roller by pouring a thin bead onto the center of the roller at rate sufficient to spread the bead laterally to the edge of the patterned area of the tool at the contact point. A linear array of UV LEDs was mounted approximately 1 cm above the tool at a location between the rubber roller and the film nip 587. The array of LEDs was controlled by a controller (obtained as Model CF2000 from Clearstone Technologies) at a power setting of 100%.

Resin was supplied to the second location on the film by manually pouring a small continuous bead of resin solution upstream of a notch bar coater using a coating gap of 1 mil (25 microns) at the hopper location upstream from the mandrel as depicted in FIG. 5. The coated resin spread laterally across the width of the tool at the rubber nip roller, forming a bank of solution approximately 8 inches (20.32 cm) wide at a nip pressure of 207 kPa (60 psi) at the contact point of the nip roller and the mandrel. The resin was cured using radiation from two Fusion D lamps as shown. The Fusion D lamps were operated at an input power of 236 watts per cm. The post cure lamp (592) was operated at a power of 118 watt per cm. The cured cavity array film article was removed from the tool at the second nip roller and wound on the rewind idler as shown in FIG. 5. The following films were prepared as shown in TABLE 5.

TABLE 5

Example 17 Light Control Film Preparation

| Film ID | Sleeve Tool # | Film Nip Pressure | Film Nip Durometer | Film Nip Resin | On Tool Coating Nip Pressure | On Tool Coating Resin |
|---|---|---|---|---|---|---|
| A | 1 | 20 psi | 92 | 1 | Not used | Not Used |
| B | 1 | 60 psi | 92 | 1 | Not used | Not Used |
| C | 1 | 60 | 95 | 2 | 60 psi | 2a |
| D | 2 | 60 | 95 | 3 | 60 psi | 3a |
| E | 2 | 60 | 95 | 4 | 60 psi | 4a |

Optical transmission through the land area was measured as described elsewhere for film Examples 1-3 (TABLE 3).

Total thickness (film+microstructure) was determined using a thickness gauge. Land thickness was determined by subtracting the thickness of the base film and the overall height (known) of the tool from the total measured thickness. In addition, land thickness was measured using SEM cross section images against a calibrated scale bar. The results are summarized in TABLE 6.

TABLE 6

Percent transmission and land thickness

| Sample | Land thickness | Relative % Transmission Through Land Regions |
|---|---|---|
| A | 10 microns | 20 |
| B | 5 | 46 |
| C | 0.5 | 76 |
| D | 0.5 | 78 |
| Control 1: Melinex 453 on glass | 0.0 | 80 |
| Control 2: clear light path | — | 100 (normalized) |

The light transmission of several LCFs as a function of viewing angle was measured using an Eldim 80 Conoscope (Eldim Corp., France). The LCFs were placed on top of a diffusely transmissive hollow light box. The luminance (cd/m2, or "nits", that is, brightness) profiles of the light box with the LCFs was measured. The diffuse transmission of the light box can be described as Lambertian. The light box was a six-sided hollow cube measuring approximately 12.5 cm×12.5 cm×11.5 cm (L×W×H) made from diffuse polytetrafluoroethylene (PTFE) plates of ~6 mm thickness. One face of the box was chosen as the sample surface. The hollow light box had a diffuse reflectance of ~0.83 measured at the sample surface (for example ~83%, averaged over the 400-700 nm wavelength range). During the testing, the box was illuminated from within through an approximately 1 cm circular hole in the bottom of the box (opposite the sample surface, with the light directed toward the sample surface from inside). The illumination was provided using a stabilized broadband incandescent light source attached to a fiber-optic bundle used to direct the light (Fostec DCR-II with a 1 cm diameter fiber bundle extension from Schott-Fostec LLC, Marlborough Mass. and Auburn, N.Y.). An Eldim 80 Conoscope (Eldim Corp, France) was used to measure the luminance (brightness) profiles of the diffuse light source both with and without an LCF.

Light transmission was determined as a function of viewing angle for film samples C, D and a sample prepared by stacking two commercially available LCFs (Vikuiti™ Advanced Light Control Film, available from 3M Company) so that the louvers crossed at 90 degrees (crossed louver film). Samples C and D were placed in the instrument in two different orientations each. Orientation 1 included aperture 2 (the smaller aperture) distal to the light source (that is, similar to FIG. 4B) and orientation 2 included aperture 2 proximal to the light source (that is, similar to 4B with the LCF 400 flipped 180 degrees relative to substrate 450).

Figure 6:
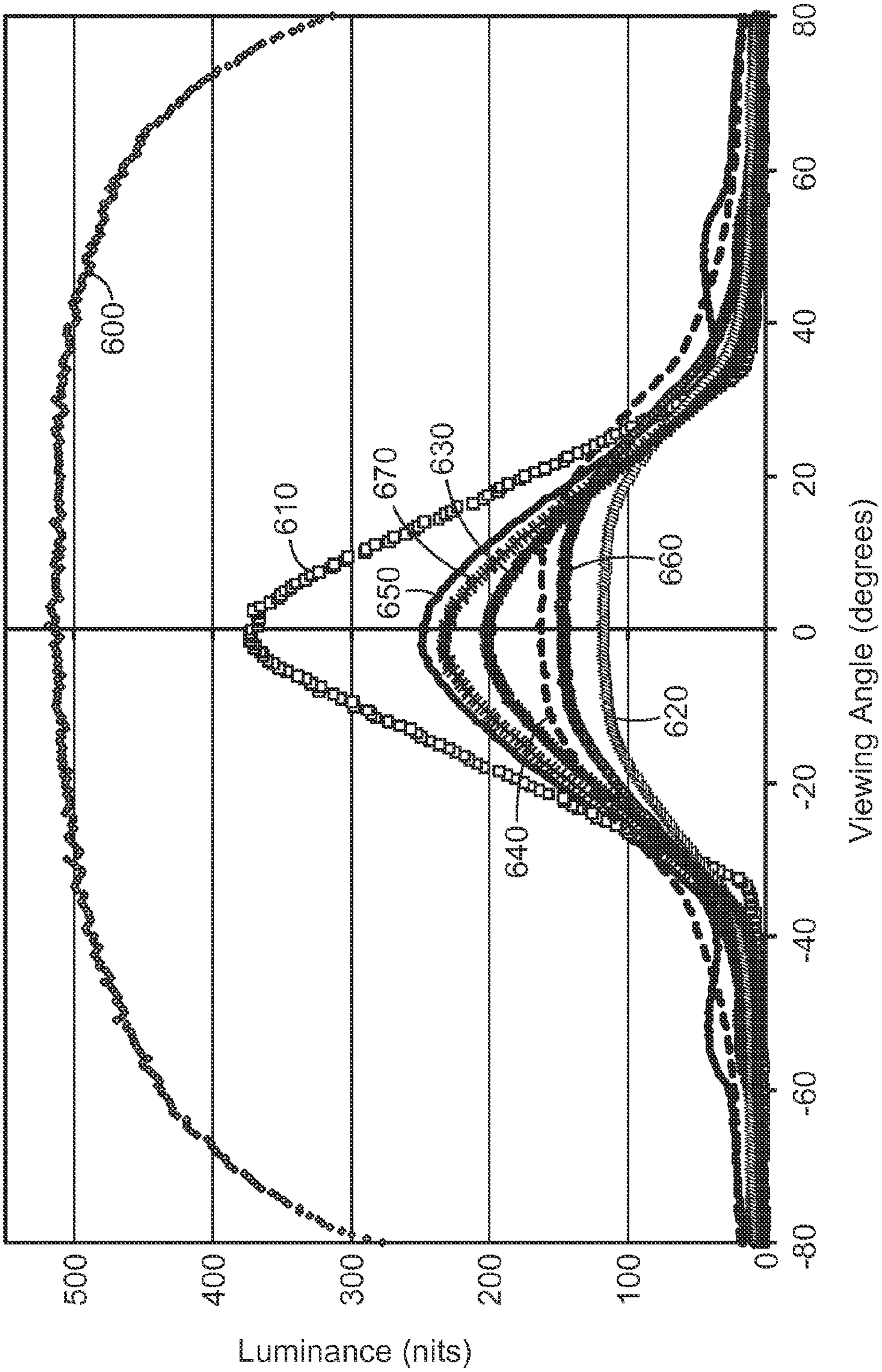
FIG. 6 shows plots of the luminance versus viewing angle for several LCFs.

FIG. 6 shows plots of the luminance versus viewing angle for several LCFs of Example 17. In FIG. 6, the light transmission as a function of viewing angle (ϕ) for diffuse light source (600), crossed louver film (610), film C in orientation 1 (620), film C in orientation 2 (630), film D in orientation 1 (640), film D in orientation 2 (650), film E in orientation 1 (660) and film E in orientation 2 (670) are labeled.

Following are a list of embodiments of the present disclosure:

Item 1 is a light control film, comprising: a first major surface and an opposing second major surface; a light absorptive material extending between the first and second major surfaces; and a plurality of optically-isolated light transmissive cavities at least partially extending between the first and second major surfaces, wherein each of the plurality of cavities comprise a first aperture coincident with the first major surface, a second aperture adjacent the second major surface, and at least one side wall extending between the first aperture and the second aperture, and further wherein the second aperture and the second major surface are separated by the light absorptive material having a land thickness greater than 0.1 microns.

Item 2 is the light control film of item 1, wherein a cross-section of each of the cavities parallel to the first major surface comprises a circular shape, an oval shape, or a polygonal shape.

Item 3 is the light control film of item 1 or item 2, wherein the side wall intersects a perpendicular to the first major surface at an angle between about 0 degrees and about 10 degrees.

Item 4 is the light control film of item 1 to item 3, wherein each of the plurality of optically-isolated light transmissive cavities have a depth D between the first and second apertures, a first aperture width W1 and a second aperture width W2 associated with a viewing plane orthogonal to the first major surface, and D/((W1+W2)/2) is at least 1.25 and D/((W1+W2)/2) is not greater than 8.25 in the viewing plane.

Item 5 is the light control film of item 1 to item 4, wherein the land thickness is between 0.1 microns and about 10 microns.

Item 6 is the light control film of item 1 to item 5, further comprising an optically transmissive film disposed adjacent at least one of the first major surface and the second major surface.

Item 7 is the light control film of item 6, wherein the optically transmissive film further comprises an adhesive.

Item 8 is the light control film of item 1 to item 7, wherein each cavity is filled with an optically transparent material.

Item 9 is the light control film of item 8, wherein the optically transparent material comprises air, a transparent polymer, or a transparent adhesive.

Item 10 is the light control film of item 8 or item 9, wherein the optically transparent material has a refractive index that is lower that the absorptive material refractive index.

Item 11 is the light control film of item 1 to item 10, wherein the light absorptive material comprises a curable resin and a colorant.

Item 12 is the light control film of item 11, wherein the curable resin comprises a radiation curable resin.

Item 13 is the light control film of item 11 or item 12, wherein the curable resin is selected from the group consisting of acrylic-based resins derived from epoxies, polyesters, polyethers, and urethanes; ethylenically unsaturated compounds; aminoplast derivatives having at least one pendant acrylate group; polyurethanes (polyureas) derived from an isocyanate and a polyol (or polyamine); isocyanate derivatives having at least one pendant acrylate group; epoxy resins other than acrylated epoxies; and mixtures and combinations thereof.

Item 14 is the light control film of item 11, wherein the colorant comprises a pigment or a dye.

Item 15 is the light control film of item 11, wherein the colorant comprises carbon black, fuchsin, carbazole violet, or Foron Brilliant Blue.

Item 16 is the light control film of item 1 to item 15, wherein the side wall further comprises a coating.

Item 17 is the light control film of item 16, wherein the coating comprises a reflective material.

Item 18 is the light control film of item 6 to item 17, wherein the optically transmissive film comprises at least one of polyethylene terephthalate, polyethylene naphthalate, high density polyethylene, low density polyethylene, and linear low density polyethylene.

Item 19 is a display device comprising the light control film of item 1 to item 18.

Item 20 is a window film comprising the light control film of item 1 to item 19.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims.

What is claimed is:

1. A light control film, comprising:

a first major surface and an opposing second major surface;

a light absorptive material extending between the first and second major surfaces; and a plurality of optically-isolated light transmissive cavities at least partially extending between the first and second major surfaces, wherein each of the plurality of cavities comprise a first aperture coincident with the first major surface, a second aperture adjacent the second major surface, and at least one side wall extending between the first aperture and the second aperture, and further wherein the second aperture and the second major surface are separated by the light absorptive material having a land thickness greater than 0.1 microns.

2. The light control film of claim 1, wherein a cross-section of each of the cavities parallel to the first major surface comprises a circular shape, an oval shape, or a polygonal shape.

3. The light control film of claim 1, wherein the side wall intersects a perpendicular to the first major surface at an angle between about 0 degrees and about 10 degrees.

4. The light control film of claim 1, wherein each of the plurality of optically-isolated light transmissive cavities have a depth D between the first and second apertures, a first aperture width W1 and a second aperture width W2 associated with a viewing plane orthogonal to the first major surface, and $D/((W1+W2)/2)$ is at least 1.25 and $D/((W1+W2)/2)$ is not greater than 8.25 in the viewing plane.

5. The light control film of claim 1, wherein the land thickness is between 0.1 microns and about 10 microns.

6. The light control film of claim 1, further comprising an optically transmissive film disposed adjacent at least one of the first major surface and the second major surface.

7. The light control film of claim 6, wherein the optically transmissive film further comprises an adhesive.

8. The light control film of claim 6, wherein the optically transmissive film comprises at least one of polycarbonate, polyethylene terephthalate, polyethylene naphthalate, high density polyethylene, low density polyethylene, and linear low density polyethylene.

9. The light control film of claim 1, wherein each cavity is filled with an optically transparent material.

10. The light control film of claim 9, wherein the optically transparent material comprises air, a transparent polymer, or a transparent adhesive.

11. The light control film of claim 9, wherein the optically transparent material has a refractive index that is lower than the absorptive material refractive index.

12. The light control film of claim 1, wherein the light absorptive material comprises a curable resin and a colorant.

13. The light control film of claim 12, wherein the curable resin comprises a radiation curable resin.

14. The light control film of claim 12, wherein the curable resin is selected from the group consisting of acrylic-based resins derived from epoxies, polyesters, polyethers, and urethanes; ethylenically unsaturated compounds; aminoplast derivatives having at least one pendant acrylate group; polyurethanes (polyureas) derived from an isocyanate and a polyol (or polyamine); isocyanate derivatives having at least one pendant acrylate group; epoxy resins other than acrylated epoxies; and mixtures and combinations thereof.

15. The light control film of claim 12, wherein the colorant comprises a pigment or a dye.

16. The light control film of claim 12, wherein the colorant comprises carbon black, fuchsin, carbazole violet, or Foron Brilliant Blue.

17. The light control film of claim 1, wherein the side wall further comprises a coating.

18. The light control film of claim 17, wherein the coating comprises a reflective material.

19. A display device comprising the light control film of claim 1.

20. A window film comprising the light control film of claim 1.

* * * * *